United States Patent
Ando et al.

(10) Patent No.: US 6,675,114 B2
(45) Date of Patent: Jan. 6, 2004

(54) METHOD FOR EVALUATING SOUND AND SYSTEM FOR CARRYING OUT THE SAME

(75) Inventors: Yoichi Ando, Kobe (JP); Hiroyuki Sakai, Kobe (JP)

(73) Assignee: Kobe University, Kobe (JP)

( * ) Notice: Subject to any disclaimer, the term of this patent is extended or adjusted under 35 U.S.C. 154(b) by 0 days.

(21) Appl. No.: 10/110,307

(22) PCT Filed: Aug. 15, 2001

(86) PCT No.: PCT/JP01/07031
§ 371 (c)(1),
(2), (4) Date: Jul. 10, 2002

(65) Prior Publication Data
US 2002/0183947 A1 Dec. 5, 2002

(30) Foreign Application Priority Data
Aug. 15, 2000 (JP) .................................. 2000-246418
Aug. 9, 2001 (JP) .................................. 2001-242267

(51) Int. Cl.⁷ .......................... G06F 19/00; H04R 5/00; H04R 29/00
(52) U.S. Cl. ...................... 702/75; 381/71.14; 702/189; 704/216
(58) Field of Search ............................. 702/75, 76, 77, 702/189, 190, 191; 704/200.1, 216; 381/71.1, 71.11, 71.12, 71.14

(56) References Cited

U.S. PATENT DOCUMENTS

| | | | | |
|---|---|---|---|---|
| 5,285,498 A | * | 2/1994 | Johnston | 381/2 |
| 5,353,372 A | * | 10/1994 | Cook et al. | 704/207 |
| 5,481,614 A | * | 1/1996 | Johnston | 381/2 |
| 5,884,261 A | * | 3/1999 | de Souza et al. | 704/255 |
| 6,167,373 A | * | 12/2000 | Morii | 704/219 |
| 6,208,958 B1 | * | 3/2001 | Cho et al. | 704/207 |

FOREIGN PATENT DOCUMENTS

| | | |
|---|---|---|
| JP | A 58-154898 | 9/1983 |
| JP | A 5-73093 | 3/1993 |
| JP | A 6-89095 | 3/1994 |
| JP | A 2000-181472 | 6/2000 |

* cited by examiner

*Primary Examiner*—Patrick Assouad
(74) *Attorney, Agent, or Firm*—Oliff & Berridge, PLC

(57) ABSTRACT

A system and method (and storage media) for identifying the category of the source noise and sound by using the physical factors derived from the autocorrelation function (ACF) and the interaural crosscorrelation function (IACF) which are ever changing in the time domain based on the model of human auditory brain function system. A method for evaluating a sound comprises the steps of: using the sound recorder to capture and record the acoustic signal; calculating the ACF from the acoustic signal using a CPU; calculating ACF factors extracted from the calculated ACF using the CPU; and identifying the kinds of the noise based on the ACF factors. Thereby the unknown noise source can be identified what it is (such as automobile noise, and factory noise), and can be identified its type such as type of cars or type of machines.

10 Claims, 16 Drawing Sheets

Left-ear signal delayed  Right-ear signal delayed

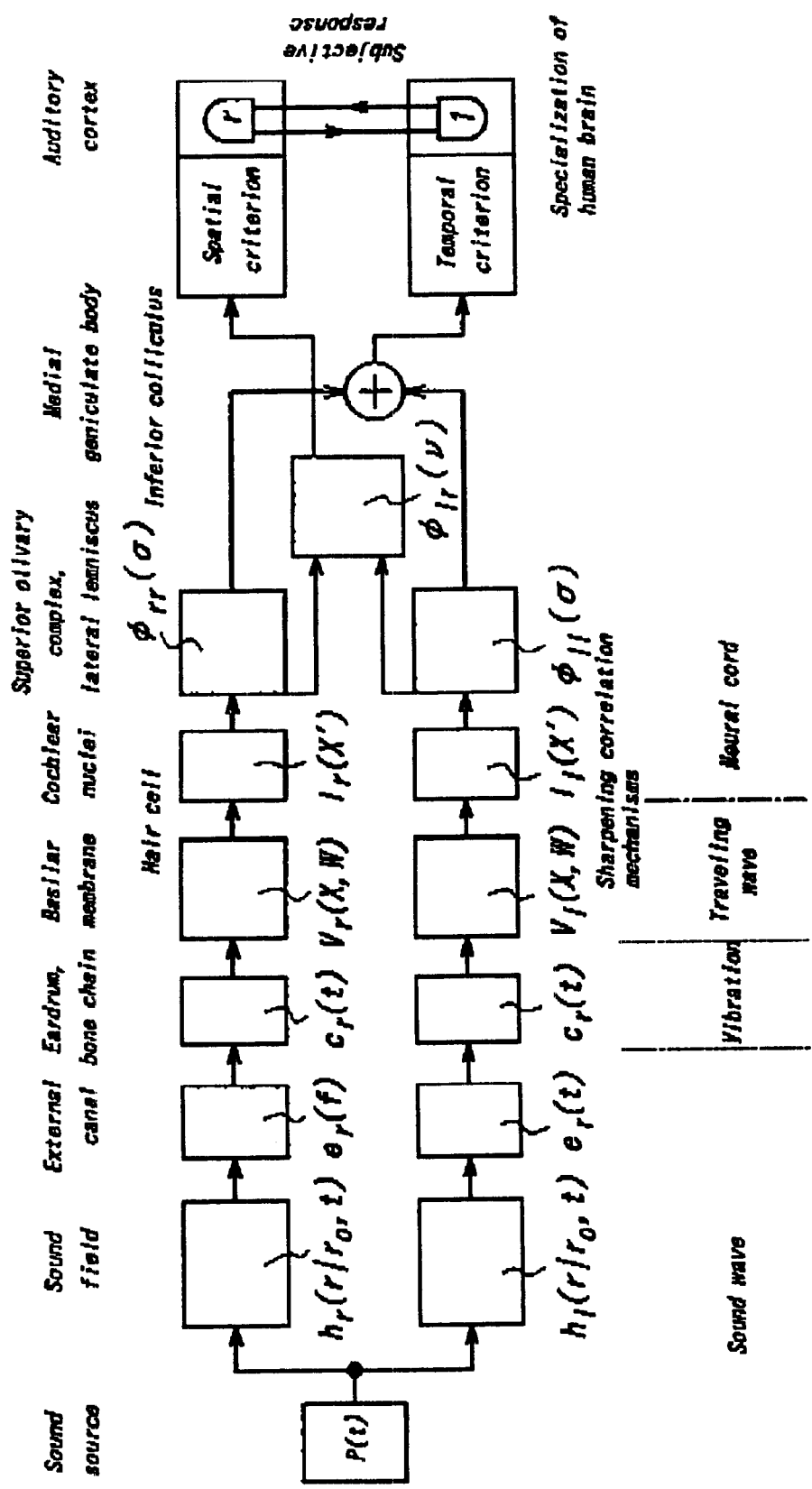

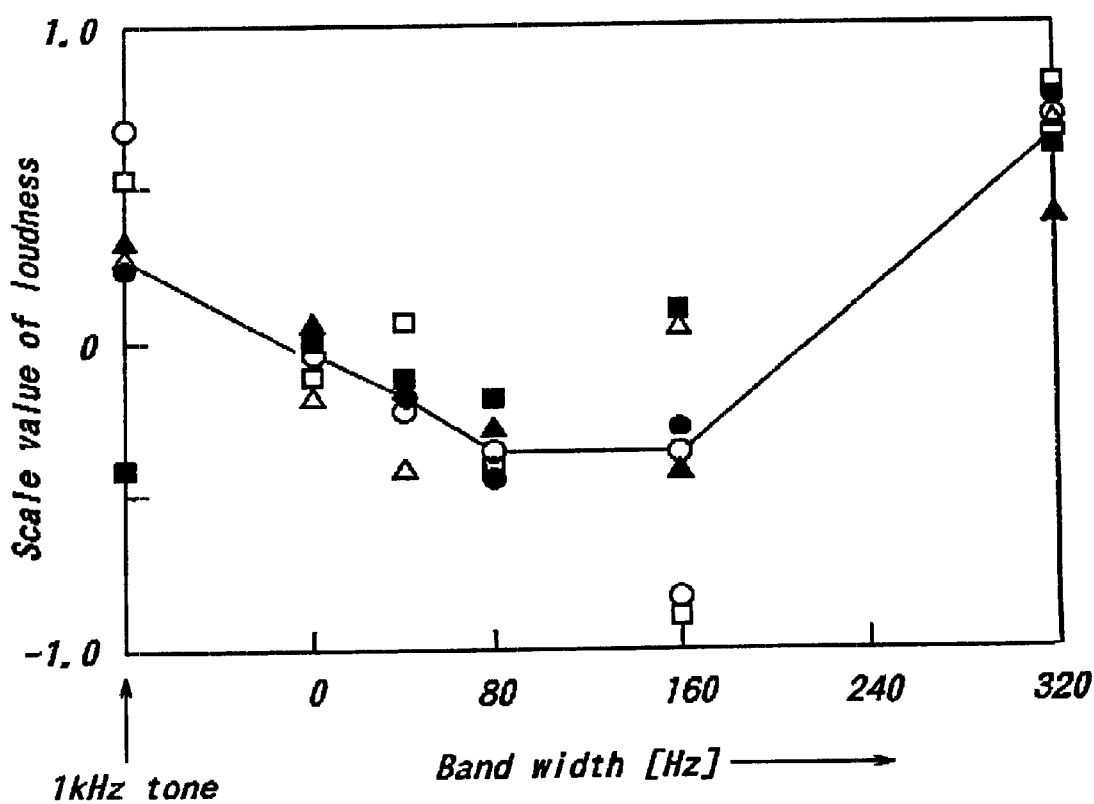

FIG. 16
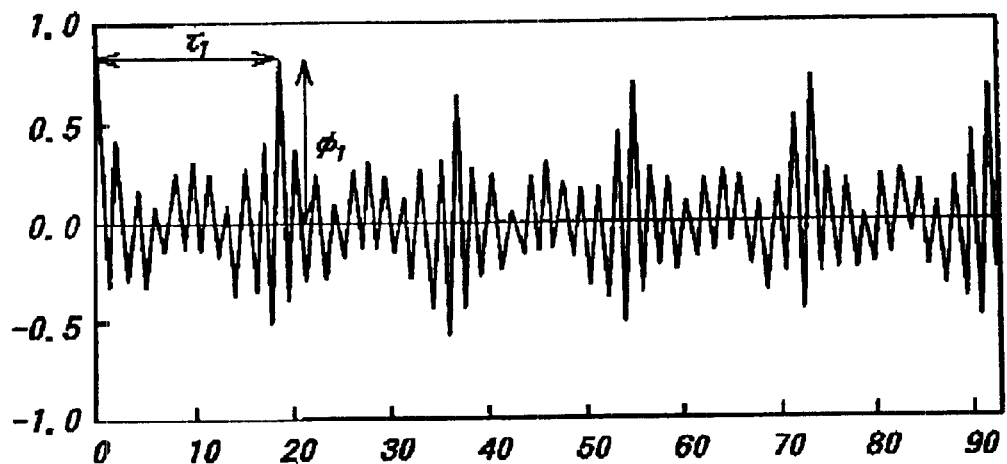
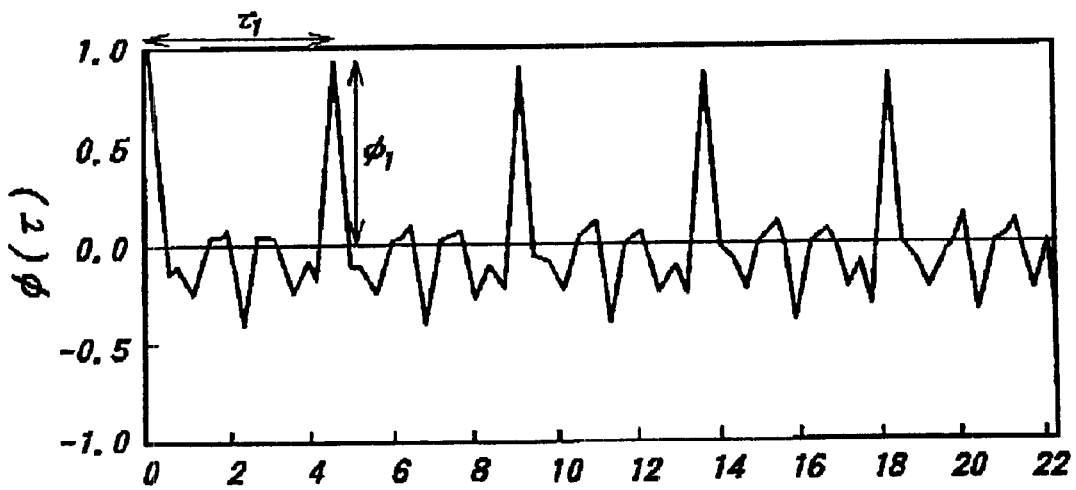
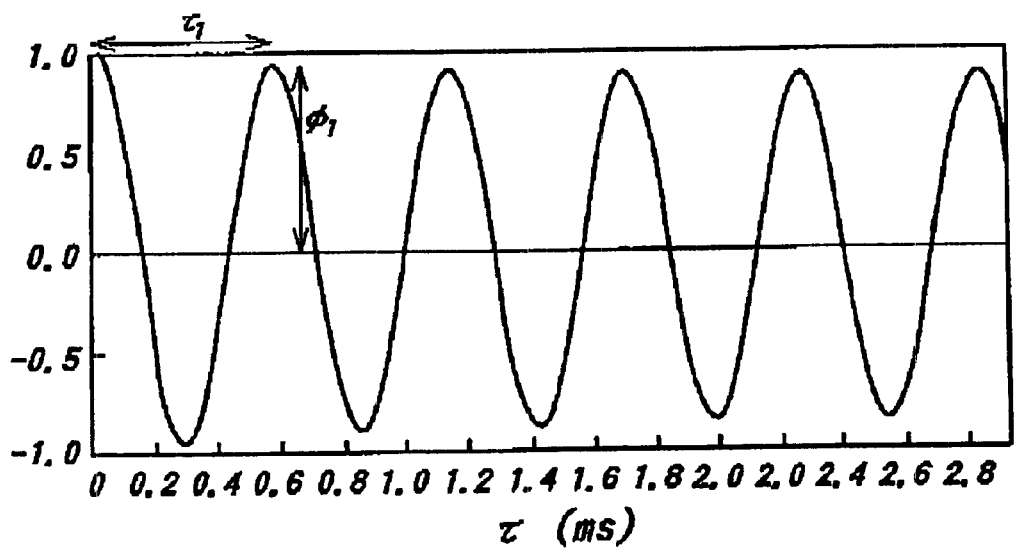

METHOD FOR EVALUATING SOUND AND SYSTEM FOR CARRYING OUT THE SAME

FIELD OF THE INVENTION

The present invention relates to a system and a method for evaluating noise and sound, and more particularly, relates to a system and a method for evaluating noise and sound based on an autocorrelation function (hereinafter called "ACF") and an interaural crosscorrelation function (hereinafter referred to as "IACF").

The present invention also relates to a system and a method for measuring and subjectively evaluating environmental noise such as automobile noise and aircraft noise, and more particularly, relates to a system and a method for measuring and subjectively evaluating noise on the basis of a binaural system.

BACKGROUND ART

Environmental noise such as atrafic noise and aircraft noise has been discussed previously with a sound pressure level and its frequency characteristic measured by using a noise level meter in monaural. However, it has been recognized that only the physical factors measured by the noise level meter in monaural mentioned above could not express sufficiently and appropriately the subjective response of the human beings. In the field of concert hall acoustics, it has been revealed that physical data of the hall in a binaural system has relevance to psychological (subjective) evaluation, whereas, in the field of the research of environmental noise, only physical data such as spectrum information in the monaural system has been dealt with.

Up to now, in the music field, in order to tune instruments as well as to evaluate tone, at first sound spectrum has been analyzed, and then ceptsrum analyzing has been effected.

For many years, the environmental noise has been evaluated in terms of the statistical sound pressure level (SPL), represented as $L_x$ or $L_{eq}$ and its power spectrum measured by a monaural sound level meter. The SPL and power spectrum alone, however, do not provide a description that matches subjective evaluations of the environmental noise.

Also, it is difficult to express appropriately psychological responses to sound by the conventional method for evaluating timble and for tuning tone.

It is an object of the present invention to provide a system, a method and a storage media for identifying a category of a noise source by using physical factors derived from an autocorrelation function ACF which always changes in the time domain as well as from an interaural crosscorrelation function IACF of a binaural signal on the basis of the human auditory-brain system.

It is another object of the present invention to provide a system, a method and a storage media for subjectively evaluating more precisely timbre, scale, loudness, pitch, tone color, perception of duration, subjective diffuseness, apparent source width for the sound field by using physical factors derived from ACF and IACF which are ever changing in the time domain based on the human auditory brain function system.

SUMMARY OF THE INVENTION

In order to attain the above mentioned objects, a method for evaluating noise and sound according to the present invention comprises the steps of:

capturing the sound and converting the captured sound into an acoustic signal;

calculating an autocorrelation function ACF by processing the acoustic signal with the aid of a computing means;

calculating at least one autocorrelation function factor (ACF factor) from the calculated ACF with the aid of the computing means; and evaluating the sound in accordance with said at least one ACF factor and a preestablished database with the aid of the computing means, said database storing at least one of the following data; tone data associating tones with ACF factors, prosodic data associating prosodic elements with ACF factors and subjective evaluation data associating subjective evaluation values with ACF factors.

According to the invention, the sound can objectively be evaluated by reading data from said preestablished database (storing data that associate various kinds of information of various musical instruments which have been evaluated to generate good sounds (scale values of, for instance, tone color, prosodic element, timbre and subjective diffuseness, scale values of apparent source width ASW and subjective evaluation values) with ACF factors and IACF factors); and by comparing the readout data with the ACF factor extracted from the acoustic signal of the target sound to derive a difference therebetween, numerical value of the difference or a degree of the difference. When the sound evaluating method according to the present invention is applied to manufacturing of musical instruments, adjustment of tone color or timbre and tuning of tonal scale, it is objectively and appropriately possible to attain an instrument which would be evaluated subjectively to have good tone color. Also, an instrument can objectively and appropriately be tuned. In other words, according to the invention, instruments which have been manufactured in accordance with craftsman's intuition could be manufactured in accordance with the objective data.

In an embodiment of the sound evaluating method according to the invention, said step of calculating at least one ACF factor comprises calculating at least one of the following ACF factors: energy $\Phi(0)$ represented at the origin of the delay (i.e. delay time is zero); an effective duration $\tau_e$; a delay time of a maximum peak $\tau_1$; an amplitude of the maximum peak of the normalized ACF $\phi_1$; and information of respective peaks within the delay time (from zero to $\tau_1$) $\tau_n'$, $\phi_n'$ (n=1, 2, 3, . . . , N (N is an integer less than approximately 10)).

According to this embodiment, a musical instrument having a subjective evaluation denoting better tone color can be more objectively and more appropriately manufactured based on the various ACF factors mentioned above and the instrument is also more objectively and more appropriately tuned.

Another embodiment of the sound evaluating method according to the invention further comprises the steps of:

calculating a pitch frequency based on the delay time $\tau_1$ of the ACF; and comparing the calculated pitch frequency with data of a predetermined tonal scale database to derive a difference therebetween to perform tuning.

According to this embodiment, under favor of the phenomenon such that an inverse number of the $\tau_1$ calculated from the sound signal correlates the pitch frequency, the musical scale of the intended instrument can appropriately be tuned. In this connection, it is possible that the predetermined tonal scale database may be superseded by the said predetermined database.

Another embodiment of the sound evaluating method according to the invention further comprises the steps of:

capturing the sound in a binaural manner and converting the captured sound into an acoustic binaural signal;

calculating an interaural crosscorrelation function IACF between left and right channels from the acoustic binaural signal with the aid of computing means;

calculating at least one interaural crosscorrelation function factors from the calculated interaural crosscorrelation function IACF with the aid of the computing means; and evaluating the sound or evaluating subjectively the sound based on the IACF factors and/or the ACF factors and the said preestablished database with the aid of the computing means.

According this embodiment, the sound evaluation and the subjective sound evaluation can objectively and appropriately be accomplished by comparing evaluation values of spatial subjective sensations such as a subjective diffuseness extracted from the IACF with data stored read out of the database to derive differences between them.

The principal conception of the present invention may be realized not only as the method mentioned above but also as a system.

For instance, a sound evaluation system according to the invention comprises:

sound capturing means for capturing a sound and converting the captured sound into an acoustic signal;

ACF calculating means for calculating an autocorrelation function ACF from the acoustic signal;

ACF factor calculating means for calculating autocorrelation function factors from the calculated autocorrelation function ACF; and evaluating means for evaluating the sound based on the ACF factors and a predetermined database storing at least one of the following data; tone data associating tones with ACF factors, prosodic data associating prosodic elements with ACF factors and subjective evaluation data associating subjective evaluation values with ACF factors.

In an embodiment of the sound evaluating system according to the invention, said ACF factor calculating means comprises calculating means for calculating at least one of the following ACF factors: energy $\Phi(0)$ represented at the origin of a delay (i.e. delay time is zero); an effective duration $\tau_e$; a delay time of a maximum peak $\tau_1$; an amplitude of a maximum peak of a normalized ACF $\phi_1$; and information of respective peaks within the delay times (from zero to $\tau_1$) $\tau_n'$, $\phi_n'$ (n=1, 2, 3, . . . , N (N is an integer less than approximately 10)).

In still another embodiment of the sound evaluation system according to the invention, the system further comprises:

pitch frequency calculating means for calculating a pitch frequency from $\tau_1$ of the ACF; and tuning means for comparing the calculated pitch frequency with data read out of a predetermined tonal scale database to represent a difference between them.

In still another embodiment of the sound evaluating system according to the invention, the system further comprises:

capturing means for capturing the sound in a binaural manner and converting the captured sound into an acoustic binaural signal;

IACF calculating means for calculating an interaural crosscorrelation function IACF between right and left channels from the acoustic binaural signal;

IACF factor calculating means for calculating an interaural crosscorrelation function factors from the calculated interaural crosscorrelation function IACF; and evaluating means for evaluating the sound or evaluating subjectively the sound based on the IACF factors and/or the ACF factors and the said preestablished database.

According to further aspect of the present invention, a method for identifying a kind of a noise source comprises the steps of:

capturing and recording a sound signal from an environmental noise source to be identified using sound recording means;

calculating an autocorrelation function ACF from the recorded sound signal by Fourier transform with the aid of computing means;

calculating autocorrelation function factors from the calculated autocorrelation function ACF with the aid of the computing means; and identifying a kind of the noise source based on the calculated autocorrelation function factors with the aid of the computing means.

In a preferable embodiment of the sound source identifying method according to the invention, said autocorrelation function factor calculating step comprises a step of calculating the following autocorrelation function factors: energy $\Phi(0)$ represented at the origin of delay (i.e. delay time is zero); effective duration $\tau_e$; delay time of a first peak $\tau_1$; and amplitude of a first peak of a normalized ACF $\phi_1$ from said autocorrelation function ACF; and said identifying a kind of a noise source comprises the steps of:

calculating logarithms of the energy $\Phi(0)$ represented at the origin of a delay (i.e. delay time is zero), an effective duration $\tau_e$, a delay time of a first peak $\tau_1$, and an amplitude of a first peak of a normalized ACF $\phi_1$ (the $\tau_n'$ and $\phi_n'$ may contingently be added) and deriving absolute values of differences (i.e. distances) between these logarithms and corresponding logarithms in templates previously made in accordance with the respective autocorrelation function factors of various noise sources;

deriving weighting coefficients for the respective autocorrelation function factors by dividing standard deviations ($S_2$) of arithmetic means of the respective autocorrelation function factors by an arithmetic mean ($S_1$) of standard deviations of all categories of the autocorrelation function factors to derive quotients and by calculating square roots of the quotients;

multiplying the respective distances with corresponding weighting coefficients for the respective autocorrelation function factors to find a total distance; and comparing the thus obtained total distance with the distances in the stored templates to select one of the distances, which is proximate to the total distance.

According to another aspect of the invention, a method for evaluating subjectively a noise source comprises the steps of:

recording acoustic signals of an environmental noise in a binaural manner using sound recording means;

calculating an autocorrelation function and an interaural crosscorrelation function between right and left ear channels from the acoustic signals with aid of computing means;

calculating autocorrelation function factors from the ACF and/or calculating interaural crosscorrelation function factors from the IACF with the aid of the computing means; and subjectively evaluating a noise source based on the autocorrelation function factors and/or the interaural crosscorrelation function factors with the aid of the computing means.

The present invention has been mainly described as methods, however it is understood that the present invention may be realized as systems corresponding to the methods, programs embodying the methods as well as a storage media storing the programs.

Description of many subjective attributes such as preference and diffuseness, as well as primary sensations (loudness, pitch, and timbre) can be based on a model of response of the human auditory-brain system to sound fields, and the predictions of the model have been found to be consistent with experimental results. The loudness of band-limited noise, for example, has recently been shown to be affected by the effective duration of the autocorrelation function (ACF), $\tau_e$, as well as by the SPL. When a fundamental frequency of complex tones is below about 1200 Hz, the pitch and its strength are influenced by a delay time of the first peak $\tau_1$ and an amplitude of a first peak of the normalized ACF $\phi_1$, respectively. In particular, the ACF factors obtained at $(\tau_e)_{min}$ are good indicators of differences in the subjective evaluation of the noise source and the noise field.

The model comprises autocorrelators for the signals at two auditory pathways and an interaural crosscorrelator between these signals, and it takes into account of the specialization of the cerebral hemisphere in humans. The ACF and interaural crosscorrelation function (IACF) of sound signals arriving at both ears are calculated. Orthogonal factors $\Phi(0)$, $\tau_0$, $\tau_1$, and $\phi_1$ are extracted from the ACF. The IACF factors LL (sound pressure level), IACC (peak magnitude), $\tau_{IACC}$ (delay time of the peck magnitude), and $W_{IACC}$ (width of the peak magnitude) are extracted from the IACF.

BRIEF DESCRIPTION OF THE DRAWINGS

FIG. 8 is a block diagram showing a model of the auditory-brain system;

FIG. 9 is a graph plotting scale values of loudness on a vertical axis and values of bandwidth on a horizontal was;

FIG. 16 is a graph plotting values of amplitude on a vertical axis and values of the delay time on a horizontal axis, which shows a wave shape of the normalized ACF extracted from captured piano sound signals.

DETAILED DESCRIPTION OF THE PREFERRED EMBODIMENTS

The present invention will be described in detail with reference to the accompanying drawings.

Figure 1:
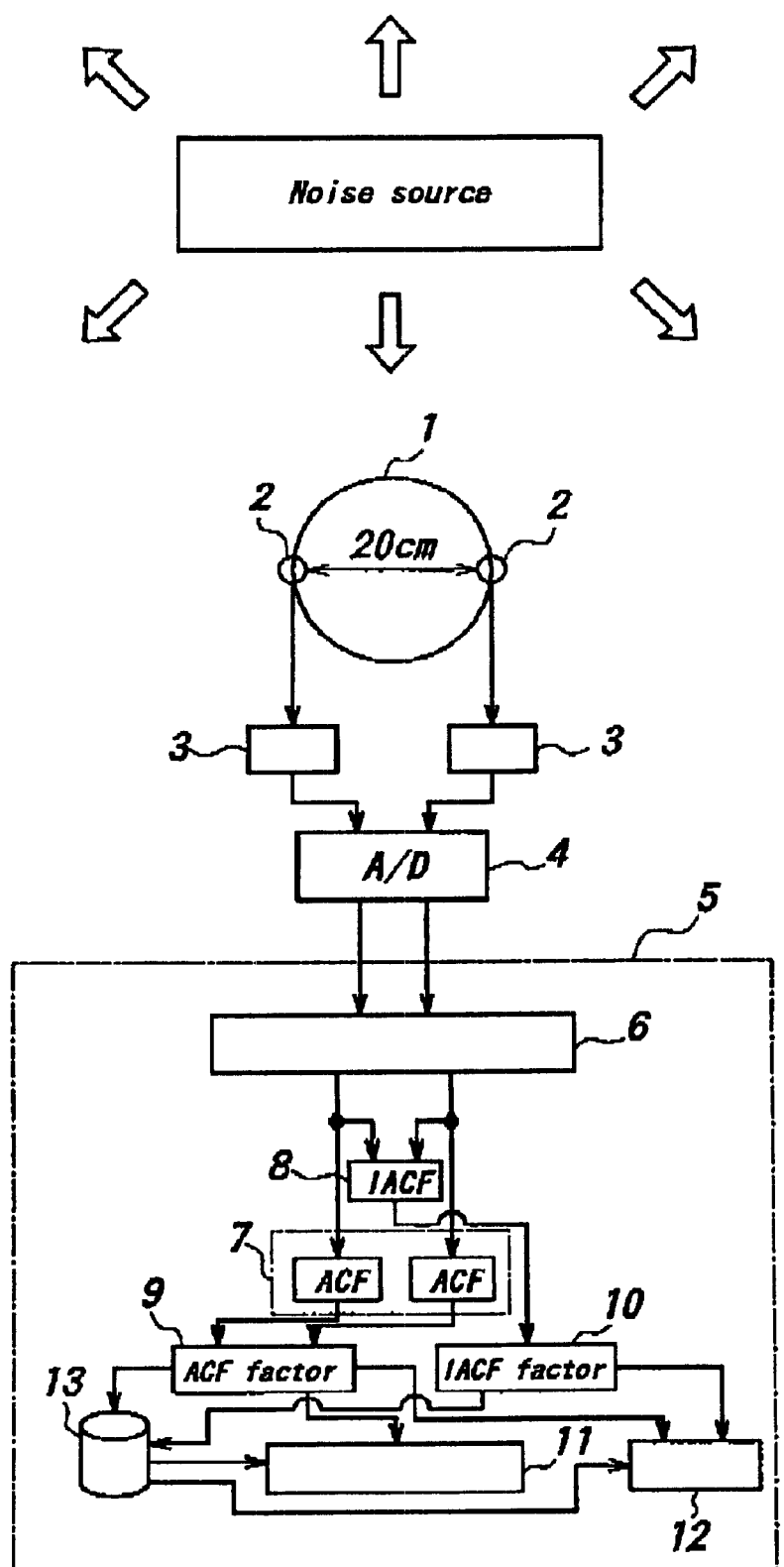
FIG. 1 is an overview diagram illustrating an arrangement of an embodiment of the sound evaluating system according to the invention.

FIG. 1 is an overview diagram illustrating an arrangement of an embodiment of the sound evaluating system according to the invention. As shown in FIG. 1, the system according to the invention includes a listener's dummy head 1, binaural sound recording means 2 (microphones), which is mounted on the dummy head 1, for capturing a sound from the noise source and converting the sound into acoustic signals, a LPF (low pass filter) 3, A/D converter 4 and a computer 5. An actual human head is most desirable for the sound recording, but it is inconvenient in practice. Therefore, the dummy head 1 modeled as a human head is utilized. A precisely manufactured dummy head is very expensive, thus in the present embodiment, a model of a head made of a polystyrene form and having a spherical shape (with a diameter of 20 cm) is used. Even using such a simple dummy head, it is possible to obtain the autocorrelation function and interaural cross-correlation function which do not significantly differ from those obtained with the aid of the precisely made dummy head. The computer 5 includes storage means 6 for storing the captured acoustic signals, ACF calculating means 7 for reading the stored acoustic signals (right and left ear dual channel signals) to calculate an autocorrelation function from the readout acoustic signals, IACF calculating means 8 for calculating an interaural crosscorrelation function from the readout acoustic signals, ACF factor calculating means 9 for calculating ACF factors from the calculated ACF, IACF factor calculating means 10 for calculating IACF factors from the calculated IACF, noise source identification means 11 for identifying a kind of a noise source based on the calculated ACF factors, subjective evaluation means 12 for subjectively evaluating the ACF factors and/or IACF factors, and a database 13 concerned with data for the identification and subjective evaluation of a noise source.

Capacitor microphones (with microphone amplifiers) mounted on right and left side heads of the head model 1 are connected with sound input/output terminals (A/D converter 4) of the portable PC 5 via the LPFs. The microphones 2 are used to capture an environmental noise. Under a program loaded into the PC, measurements, computation of physical factors, an identification of a kind of a noise source and a subjective evaluation are executed. The database concerned with data for identification of a kind of a noise source and for subjective evaluation is built.

Figure 2:
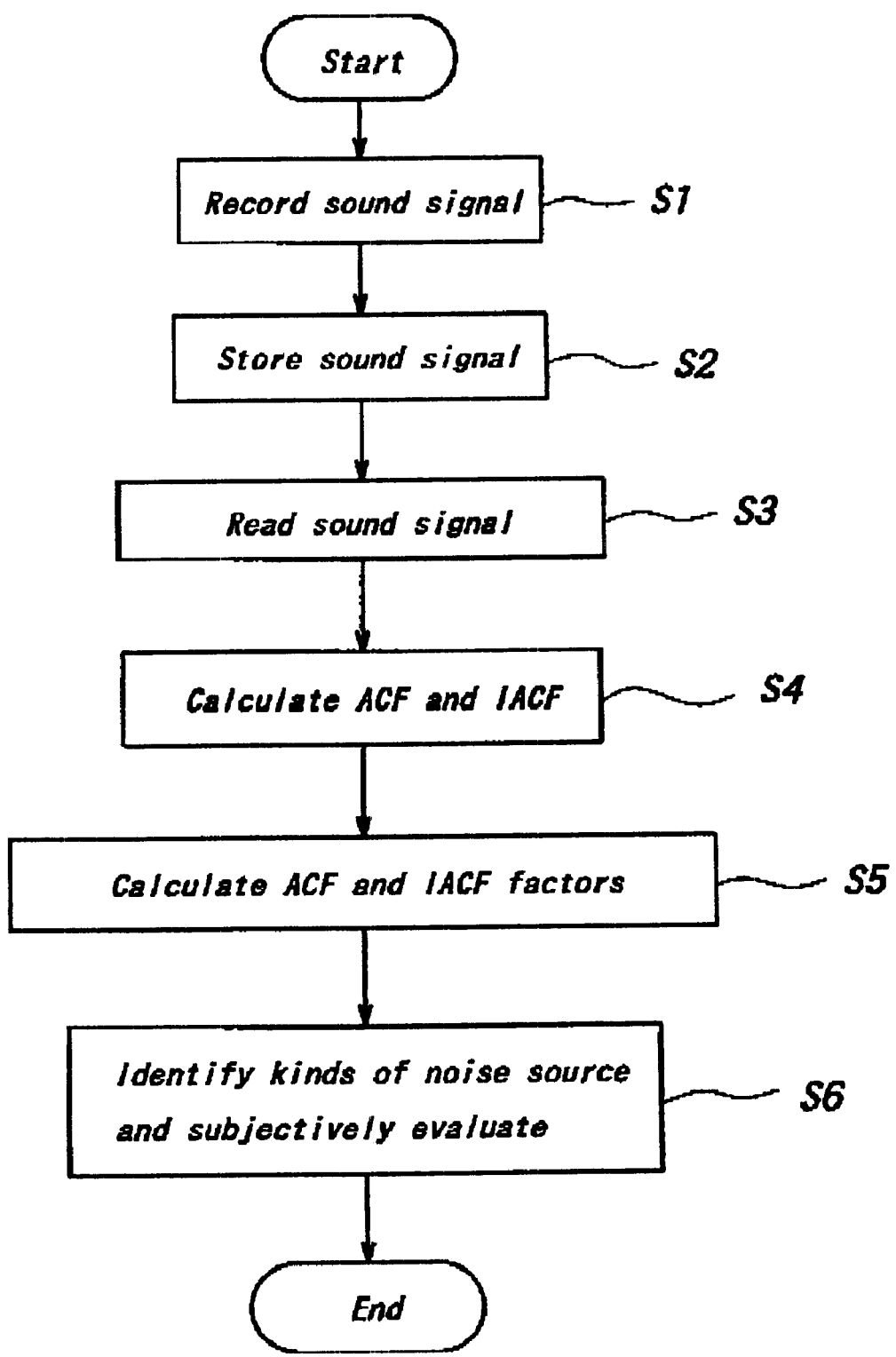
FIG. 2 is a flowchart showing the method for identifying and subjectively evaluating the noise source.

FIG. 2 is a flowchart showing the method for identifying and subjectively evaluating the noise source. As shown FIG. 2, in a step S1, a sound from the noise source is captured and is converted into acoustic signals by using the sound recording means 2. The captured acoustic signals are supplied via LPF 3 to the A/D converter 4 and are converted into digital values. In a next step S2, the acoustic signals captured in the step S1 are stored. In a step S3, the acoustic signals stored at the step S2 are read out. At a step S4, the ACF calculating means 7 and IACF calculating means 8 calculate ACFs and IACF based on the readout acoustic signals. In a step S5, the ACF factor calculating means 9 and IACF calculating means 10 calculate ACF factors and IACF factors based on the ACFs and IACF calculated in the step S4. In a step S6, the noise source identification means 11 identifies a kind of the noise source and the subjective evaluation means 12 evaluates subjectively the sound. When the identification and the evaluation are executed, necessary data is read out of the database 13 storing templates as reference data, and the calculated factors are compared with the reference data.

Figure 3:
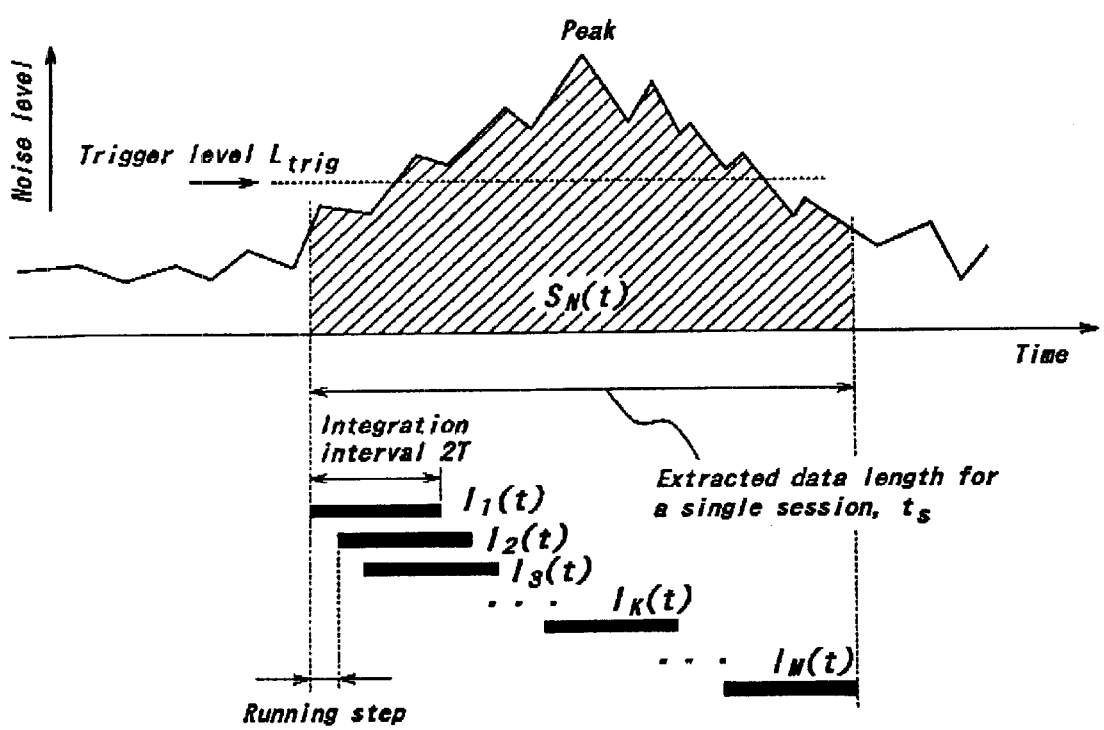
FIG. 3 is a schematic diagram depicting a procedure of the peak detection, an upper block of the diagram showing a graph plotting a noise level on a vertical axis and time on a horizontal axis) and a lower block of the diagram showing a diagram depicting integral intervals.

For a start, a number of measurement sessions of the captured acoustic signal are extracted by peak-detection process. In order to automatically extract environmental noises or target noises from a continuous noise, a monoaural energy $\Phi_{ll}(0)$ or $\Phi_{rr}(0)$, which are energies at the left or right ear entrance respectively, is continuously analyzed. FIG. 3 is a schematic diagram depicting a procedure of the peak detection, an upper block of the diagram shows a graph plotting a noise level on a vertical axis and time on a horizontal axis, and a lower block of the diagram shows a diagram depicting integral intervals. The interval for the calculation of $\Phi(0)$ can be fairly long, say 1 second, when the noise is a continuous noise such as an aircraft noise or a railway noise, but a shorter interval must be used when the noise is brief or intermittent. For the running calculation in equation (1) described below, however, it may be necessary to select an interval longer than the integration interval. Thus, this time interval must be determined according to the kinds of the noise source.

This enables $\Phi(0)$ to be determined more accurately than it can be determined when using a conventional sound level meter with a long distance, i.e. a long time constant. The peaks cannot be detected unless the trigger level $L_{trig}$ is properly set in advance. The appropriate $L_{trig}$ value also varies according to the kinds of the target noise, the distance between the target and the receiver, and atmospheric conditions. It must therefore be determined by means of a preliminary measurement. It is easy to determine the value of $L_{trig}$, when the distance between the target and the receiver is short and there is no interfering noise source near the receiver. The noise centered on its maximum $\Phi(0)$ is recorded on the system as a single session. The duration of one session for each target noise (i.e. $t_s$) should be selected so as to include $\Phi(0)$ peak after exceeding $L_{trig}$ value. For normal environmental noise like an aircraft noise and a railway noise, the value of $t_6$ is approximately 10 s. This is different from a steady-state noise with longer duration or an intermittent noise with shorter duration. It is noted that the present system cannot be used when there are interfering noises. As shown in FIG. 3, the set of sessions $\{S_1(t), S_2(t), S_3(t), \ldots S_N(t); N:$ the number of sessions, $0<t<t_s\}$ is stored on the system automatically.

The running ACF and running IACF for each session $S_N(t)$ with duration $t_s$ are analyzed as shown in FIG. 3. Here we consider only a single session in order to explain the process of "running". Appropriate values for the integration interval 2T and running step $t_{step}$ are determined before the calculation. As mentioned above, the recommended integration interval is approximately (30 $\Phi(0)$ $\tau_e(\min)$[ms]), where $\tau_e(\min)$ is the minimum value of the running series of values $\tau_e$, and can easily be found by the preliminary measurement. This is found by use of data of different kind of environmental noises. In most cases, adjoining integration intervals overlap each other.

The ACF and the IACF are calculated every step (n=1, 2, ..., M) within one session with the range of 2T which shifts in every $t_{step}$, as $\{(0,2T),(t_{step},t_{step}+2T),(2t_{step},2t_{step}+2T), \ldots ,((M-1)t_{step},(M-1)t_{step}+2T)\}$. Physical factors are extracted from each step of the ACF and the IACF. The 2T must be sufficiently longer than the expected value of $\tau_e$. Also, it is deeply related to an "auditory time-window" for sensation of each step. A 2T between 0.1 and 0.5 s may be appropriate for an environmental noise. If 2T is less than this range, the $\tau_e(\min)$ converges at a certain value. Generally, it is preferable that tap is about 0.1 s. If a more detailed activity of fluctuation is necessary, a shorter $t_{step}$ should be selected. As is well known, the ACF and the IACF are obtained by using FFT (fast Fourier transformation) for the binaural signals and then using the inverse FFT. The A-weighting filter and frequency characteristics of microphones must be taken into consideration after the process of FFT.

The ACF at the left and right ears are respectively represent as $\Phi_{ll}(\tau)$ or $\Phi_{rr}(\tau)$. In discrete numbers, they are represented as $\Phi_{ll}^{(i)}$ and $\Phi_{rr}^{(i)}$ (1<I<Tf; f: sampling frequency [Hz]; I: integer). In the calculation of $\Phi(0)$ for left and right values, $\Phi_{ll}^{(i)}$ and $\Phi_{rr}^{(i)}$ are averaged as follows:

$$\Phi_{ll,rr}(0) = \frac{1}{Tf}\left(\sum_{i=1}^{Tf}\left(\Phi_{ll,rr}^{(i)}\right)^2\right)^{1/2} \quad (1)$$

An accurate value for the SPL is given by the following equation:

$$SPL = 10\log_{10}\sqrt{\Phi_{ll}(0)\Phi_{rr}(0)} - 10\log_{10}\Phi_{ref}(0) \quad (2)$$
$$\approx 10\log_{10}\Phi_{ll}(0) - 10\log_{10}\Phi_{ref}(0)$$
$$\approx 10\log_{10}\Phi_{rr}(0) - 10\log_{10}\Phi_{ref}(0)$$

where $\Phi_{ref}(0)$ is the $\Phi(0)$ at the reference sound pressure, 20 $\mu$Pa. The binaural listening level is the geometric mean of $\Phi_{ll}(0)$ or $\Phi_{rr}(0)$:

$$\Phi(0)=\sqrt{\Phi_{ll}(0)\Phi_{rr}(0)} \quad (3)$$

Since this $\Phi(0)$ is the dominator for normalization of IACF, it can be considered to be classified as one of the IACF factors: or the right hemispheric spatial factors.

The effective duration $\tau_e$, is defined by the delay time at which the envelope of the normalized ACF becomes 0.1 (the ten-percentile delay). The normalized ACF for the left and right ears, $\Phi_{ll,rr}(\tau)$, is obtained as $$\phi_{ll,rr}(\tau) = \frac{\Phi_{ll,rr}(\tau)}{\Phi_{ll,rr}(0)} \quad (4)$$

Figure 4:
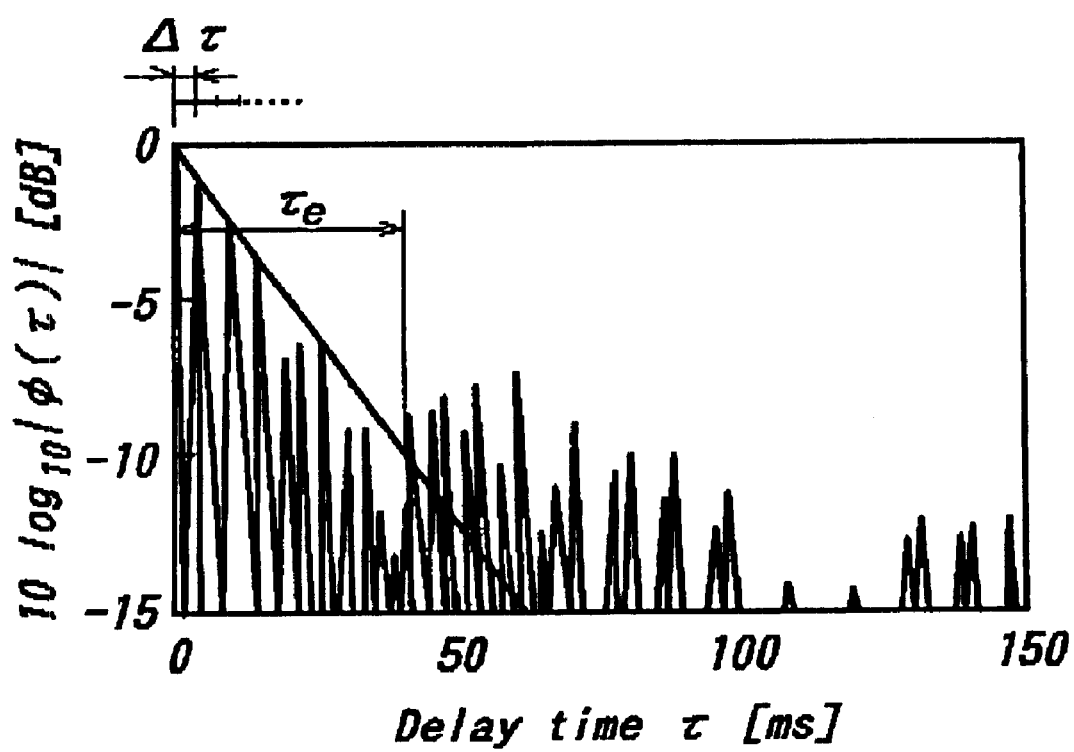
FIG. 4 is a graph plotting absolute values of logarithm of the ACF on a vertical axis and the delay time on a horizontal axis.

FIG. 4 is a graph plotting absolute values of logarithm of the ACF on a vertical axis and the delay time on a horizontal axis. As shown in FIG. 4, it is easy to obtain $\tau_e$ if the vertical axis transforms into decibel (logarithmic) scale, because the linear decay for initial ACF is usually observed. For the linear regression, the least means square's (LMS) method for ACF peaks which are obtained within each constant short time range $\Delta\tau$ is used. The $\Delta\tau$ is used for the detection of peaks the ACF and must be carefully determined before the calculation. In calculating $\tau_e$, the origin of the ACF (=0, at $\tau$=0) is sometimes excluded if the origin is not in the regression line. As an extreme example, if the target noise consists of a pure tone and a white noise, rapid attenuation at origin due to the white-noise components is observed. And the subsequent decay is kept flat because of the pure-tone component. In such a case, the solution of the ACF function is not found.

Figure 5:
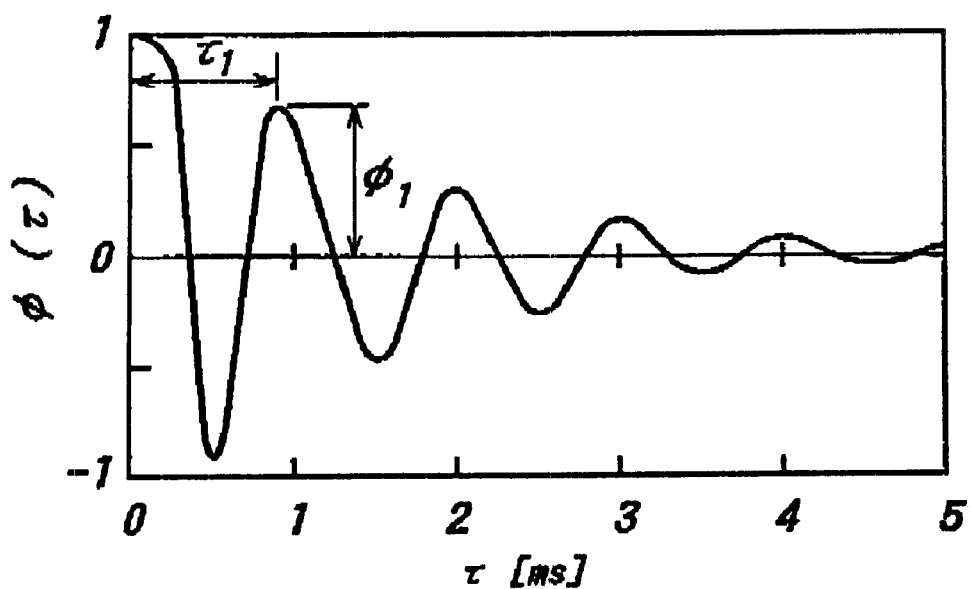
FIG. 5 is a graph plotting values of the normalized ACF on a vertical axis and values of the delay time on a horizontal axis.

FIG. 5 is a graph plotting values of the normalized ACF on a vertical axis and values of the delay time on a horizontal axis. As shown in FIG. 5, $\tau_1$ and $\phi_1$ are respectively the delay time and amplitude of the first peak of the normalized ACF. The first maximum must be determined as a main peak avoiding local minor peaks. The factors $\tau_n$ and $\phi_n$ ($n \geq 2$) are excluded because they are usually related to $\tau_1$ and $\phi_1$.

Figure 6:
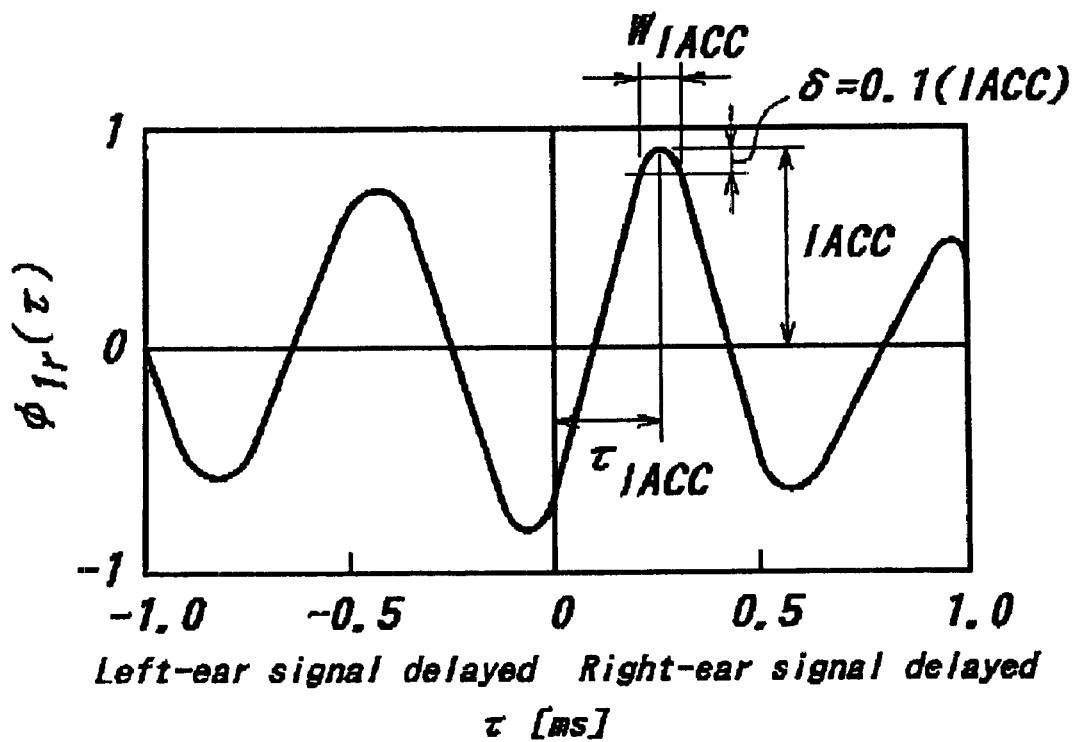
FIG. 6 is a graph plotting values of the normalized IACF on a vertical axis and values of the delay time of the right and left ear signals on a horizontal axis.

FIG. 6 is a graph plotting values of the normalized IACF on a vertical axis and values of the delay time of the left and right ear signals on a horizontal axis. The IACF between sound signals at left and right ears is represented as $\Phi_{lr}(\tau)$ ($-1 < \tau + 1$ [ms]). In the digital forms, it is represent as $\Phi_{lr}(\tau)(-f/10^3 \leq i \leq f/10^3$; i: integer, where negative values signify the IACF as the left channel delayed). Thus, it is enough to consider only the range from $-1$ to $+1$ ms, which is the maximum possible delay between the ears. The maximum amplitude i.e. the IACC is a factor related to the subjective diffuseness. As shown in FIG. 6, it is obtained as the maximum amplitude of the normalized IACF $\phi_{lr}^{(i)}$ within the delay range. Thus, $$IACC = \{\phi_{lr}^{(i)}\}_{max} \quad (5)$$

The normalized IACF is given by $$\phi_{lr}^{(i)} = \frac{\Phi_{lr}^{(i)}}{\Phi(0)} \quad (6)$$

The value of $\tau_{IACC}$ is simply obtained at the time delay of the maximum amplitude. For example, $\tau_{IACC}$ is greater than zero (positive), the sound source is on the right side of the receiver or perceived as if it were. As shown in FIG. 6, the value of $W_{IACC}$ is given by the width of the peak at the level 0.1 (IACC) below the maximum value. The coefficient 0.1 is approximately used as JND at IACC=1.0. The listening level LL is obtained by the manner represented in equation (2) replacing SPL with LL. Thus, each of physical factors can be obtained based on the ACF and IACF.

Next, the method for identifying the kinds of noise sources based on the ACF factors will be described.

The kinds of the noise sources are identified using four ACF factors: energy $\Phi(0)$ represented at the origin of the delay (i.e. delay time is zero); effective duration $\tau_e$; delay time of the first (maximum) peak $\tau_1$; amplitude of first (maximum) peak of the normalized ACF $\phi_1$. Since the $\Phi(0)$ varies according to the distance between the source and the receive, spatial attention is paid to the conditions for calculation if the distance is unknown. Even if the factor $\Phi(0)$ is not useful, the noise source can be identified by using the other three factors. Remaining IACF factors may be taken into account if the spatial information is changed. One of the reason for using $\tau_e$ (i.e. $(\tau_e)_{min}$), which represents the most active part of the noise signal, is that the piece is most deeply associated with subjective responses. The distance between values of each factor at $(\tau_c)_{min}$ for the unknown target data (indicated by the symbol a in equations (7–10) below), and values for the template (indicated by the symbol b) ate calculated. Here, "target" is used as an environmental noise as an object to be identified by the present system. Template values of are a set of typical ACF factors for specific environmental noise, and these templates for comparison with an unknown noise.

The distance $D(x)$ (x: $\Phi(0)$, $\tau_e$, $\tau_1$, and $\phi_1$) is calculated in the following manner.

$$D(\Phi(0)) = |log(\Phi(0))^a - log(\Phi(0))^b| \quad (7)$$

$$D(\tau_e) = |log(\tau_e)_{min}^a - log(\tau_e)_{min}^b| \quad (8)$$

$$D(\tau_1) = |log(\tau_1)^a - log(\tau_1)^b| \quad (9)$$

$$D(\phi_1) = |log(\phi_1)^a - log(\phi_1)^b| \quad (10)$$

The total distance D of the target can be represented as following equation.

$$D = W^{\Phi(0)}D(\Phi(0)) + W^{\tau_e}D(\tau_e) + W^{\tau_1}D(\tau_1) + W^{\phi_1}D(\phi_1) \quad (11)$$

where $W^{(x)}$ (x; $\Phi(0)$, $(\tau_e)_{min}$, $\tau_1$, $\Phi_1$) signifies the weighting coefficient. The template with the nearest D can be taken as the identified noise source. Thereby the unknown noise source can be identified what it is (such as railway noise, automobile noise, and factory noise), and can be identified its type such as type of cars or type of machines.

Figure 7:
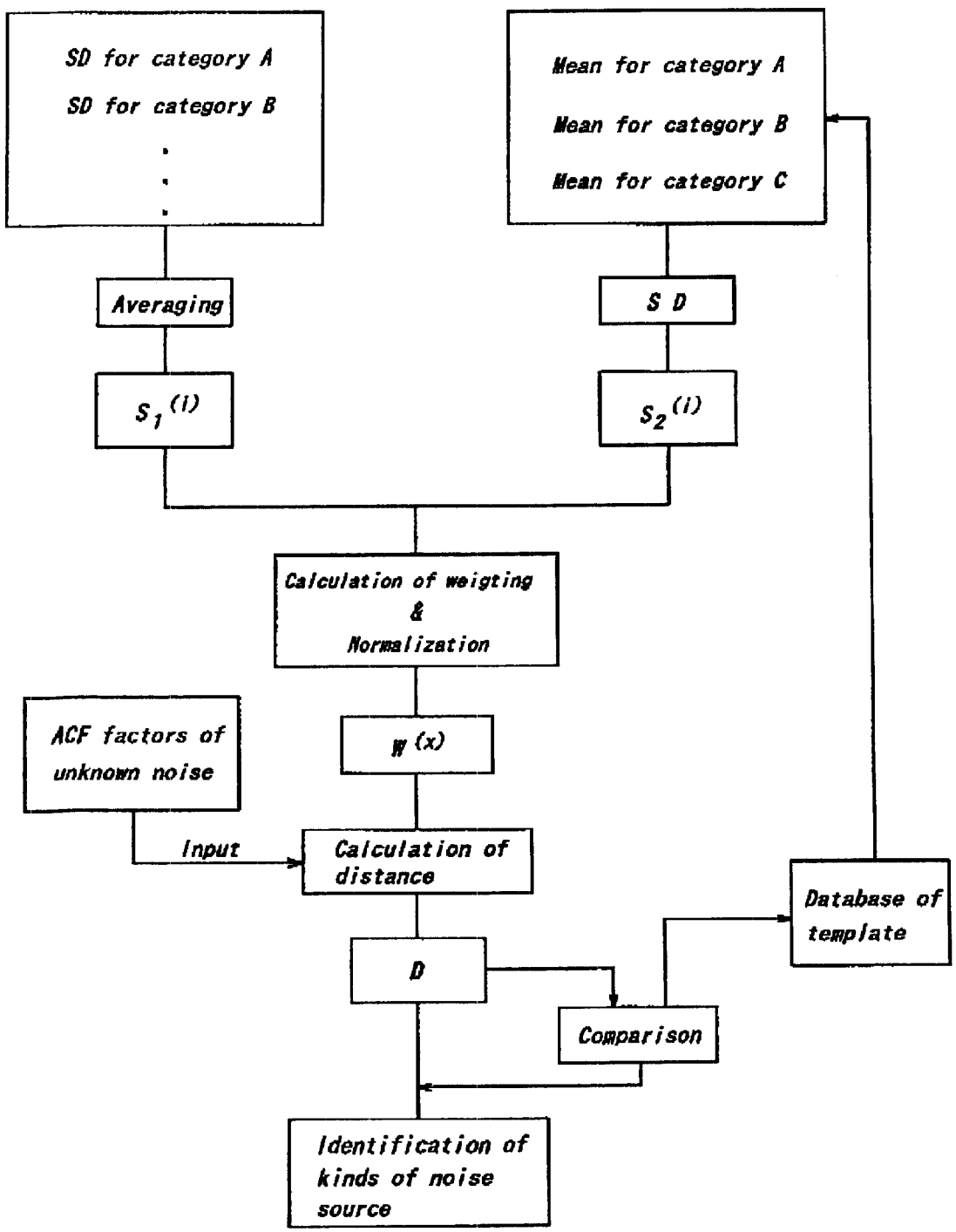
FIG. 7 is a block diagram illustrating a method for calculating weighting coefficients.

FIG. 7 is a block diagram illustrating a method for calculating weighting coefficients. Weighting coefficients $W^{(x)}$ (x; $\Phi(0)$, $(\tau_e)_{min}$, $\tau_1$, $\Phi_1$) in equation (11) are obtained in the following manner by use of statistical values, $s_1$ and $s_2$. As shown in FIG. 7, the value of $s_1$ is obtained as an arithmetic mean of a standard deviation through all categories for each ACF factor after calculating standard deviation within the same category representing the same kind of noise. The value of $s_2$ is obtained as a standard deviation for all categories after obtaining arithmetic means for respective factors within the same category. Weighting coefficients $W^{(x)}$ are given as $\{(s_2/s_1)^{1/2})\}$ after normalization by maximum values among factors, $\{(s_2/s_1)^{1/2})\}_{min}$. Process of the square root is obtained expedentially. As a factor with larger SD between noise sources and with smaller SD among a certain source can be distinct the different kinds of noise, weighting of such a factor should be larger than the other factors. If the learning function toward to the improvement of the template is given, a template may be overwritten in order by average values of each ACF factor between latest values and previous values in the system.

FIG. 8 is a block diagram showing a model of the auditory-brain system. The model of the auditory-brain system includes an ACF mechanism, an IACF mechanism and a specialization of the cerebral hemisphere. It is noteworthy that information, which is included in power spectrum of a signal, is also included in an ACF of a sound signal. In order to describe spatial sensation to the noise field, spatial factors extracted from IACFs are taken into account. Timbre is defined as an overall sensation including the primitive sensations and spatial sensations.

Using the auditory-brain model (FIG. 1), we now consider primary sensations of a given sound signal p(t) located in front of a listener in a free field. The long-term ACF is defined by $$\Phi_p(\tau) = \lim_{T \to \infty} \frac{1}{2T} \int_{-T}^{+T} p'(t)p'(t+\tau)\,dt \quad (12)$$

where the p'(t)=p(t)Φ(0) s(t), s(t) being the ear sensitivity. For sake of convenience, s(t) may be chosen as the impulse response of an A-weighted network. The power density spectrum may also be obtained from ACF defined by $$p_d(\omega) = \int_{-\infty}^{+\infty} \Phi_p(\tau) e^{-j\omega\tau}\,dt \quad (13)$$

And, $$\Phi_p(\tau) = \int_{-\infty}^{+\infty} p_d(\omega) e^{j\omega t}\,dt \quad (14)$$

Thus the ACF and power density spectrum mathematically contain the same information.

In the ACF analysis, there are three significant items:
(1) Energy represented as the origin of the delay, $\Phi_p(0)$;
(2) Effective duration of me envelope of the normalized ACF, $\tau_e$; and
(3) Fine structure, including peaks, dips and delays.

As shown FIG. 4, $\tau_c$ is defined by the ten-percentile delay and which represents a repetitive feature or reverberation containing the noise source itself. As described above the normalized ACF is defined by $\phi_p(\tau) = \Phi_p(\tau)/101_p(0)$.

Loudness $S_L$ is given by following equation.

$$S_L = f_L(\Phi_0(0), \tau_1, \phi_1, \tau_e) \quad (15)$$

In short, loudness can be obtained by ACF factors: energy Φ(0) represented at the origin of the delay (i.e. delay time is zero); effective duration $\tau_e$; delay time of the maximum peak $\tau_1$; amplitude of maximum peak of the normalized ACF $\phi_1$. Where the value of $\tau_1$ corresponds to pitch of the noise and/or the missing fundamental as discussed below. When p'(t) is measured with reference to the pressure 20 μPa leading to the level L(t), the equivalent sound pressure level $L_{eq}$ can be obtained as follows.

$$L_{eq} = 10\log \frac{1}{T} \int_0^T 10^{\frac{L(t)}{10}}\,dt \quad (16)$$

This $L_{eq}$ corresponds to $10\log\Phi_p(0)$. Since the sampling frequency of the sound wave must be more then the twice of the maximum audio frequency, this value can be far more accurate than the $L_{eq}$ which is measured by the conventional sound level meter.

FIG. 9 is a graph plotting scale values of loudness on a vertical axis and values of bandwidth on a horizontal axis. This graph shows that scale values of loudness within the critical band that were obtained in paired-comparison tests (with filters with the slope of 1080 dB/Octave) under the conditions of a constant $\Phi_p(0)$. Obviously, when a noise has the similar repetitive feature, $\tau_c$ becomes a greater value, as like a pure tone, than the greater loudness results. Thus a plot of loudness versus bandwidth is not flat in the critical band. In this connection, this result is obtained in the frequency range centered on 1 kHz.

Pitch or missing fundamental of the noise is defined by $$S_p = f_p(\tau_1, \phi_1) \quad (17)$$

Missing fundamental phenomenon is that if there are several of harmonic tones, listener perceives pitch of the sound which is not exist in fact.

Timbre, which is most complicated sensation and includes loudness and pitch, is defined by $$S_T = f_T[\Phi(0), \tau_e, (\tau_1, \phi_1), (\tau'_d, \phi'_1) \ldots, (\tau'_n, \phi'_n)] \quad (18)$$

Since $(\tau_1, \phi_1)$ are the most significant orthogonal factors in $(\tau_n, \phi_n)$ (n=1, 2, ...), thus, equation (11) can be rewritten as $$S_T = f_T[\Phi(0), \tau_e, \tau_1, \phi_1)] \quad (19)$$

Perception of the signal duration is given by $$S_D = f_D[\Phi(0), \tau_e, \tau_1, \phi_1)] \quad (20)$$

Long-term IACF is given by $$\Phi_{lr}(\tau) = \lim_{T \to \infty} \frac{1}{2T} \int_{-T}^{+T} p'_l(t) p'_r(t+\tau)\,dt \quad (21)$$

where $p'_{l,r}(t) = p(t)_{l,r}\Phi(0) s(t)$, $p(t)_{l,r}$ being the sound pressure at the left- and right-ear entrance.

Spatial factor, which includes perceived directions of a noise source, in the horizontal plane, is given by $$S = f(LL, IACC, \tau_{IACC}, W_{IACC}) \quad (22)$$

Where $LL = \{\Phi_{ll}(0), \Phi_{rr}(0)\}$. The symbol $\{\}$ signifies a set, $\Phi_{ll}(0)$ and $\Phi_{rr}(0)$ being ACFs at τ=0 (sound energy), of the signals arriving at the left and right ear-entrances. Mathematically, LL is expressed by the geometrical mean of the energies of sound signals arriving at the both ear entrance.

That is, $$LL = 10\log_{10}\sqrt{\Phi_{ll}(0)\Phi_{rr}(0)}\,[dB] \quad (23)$$

In these four orthogonal factors in equation (22), the $\tau_{IACC}$ (within the range from −1 to +1 ms) is a significant factor with respect to the perceived directions of a noise source in the horizontal plane. A well-defined direction is perceived when the normalized interaural crosscorrelation function has one sharp maximum, a high value of the IACC and narrow value of the $W_{IACC}$, due to high frequency components. On the other hand, subjective diffuseness or ambiguous spatial direction impression is perceived when IACC indicates low value (IACC<0.15).

For the perception of a noise source located in the medium plane, the temporal factors extracted from the long-term ACF of sound signal arriving at the ear-entrances should be added into equation (22).

As shown in FIG. 8, a remarkable finding is that there are neural activities at the inferior colliculus corresponding to the IACC and sound energies for sound signals that arriving at the two-ear entrances. Also, it is discovered that LL and IACC are dominantly associated with the right cerebral hemisphere, and the temporal factors $\Delta t_1$ and $T_{sub}$ are associated with the left cerebral hemisphere.

In order to obtain scale values of subjective diffuseness, paired-comparison tests using white noise with varying the horizontal angle of two symmetric reflections have been conducted. Listeners judged which of two sound fields were perceived as more diffuse, under the constant conditions of LL, $\tau_{IACC}$, $W_{IACC}$. FIG. 10 is a graph plotting scale value of subjective diffuseness on a left vertical axis, value of IACC on a right vertical axis and horizontal angle of reflection on a horizontal axis. As shown in FIG. 10, the strong negative correlation between the scale value and the maximum amplitude i.e. IACC can be found in the results with frequency band between 250 Hz–4 kHz (in FIG. 10, (a): 250 Hz, (b) 500 Hz, (c): 1 kHz, (d): 2 kHz, (e); 4 kHz). The scale value of subjective diffuseness may be well formulated in terms of the 2/3 power of the IACC, and is defined as follows.

$$S_{diffuseness} = -\alpha(IACC)^\beta \quad (24)$$

where coefficients $\alpha=2.9$ and $\beta=2/3$, which are obtained experimentally.

A method for finding apparent source width (ASW) of noise field will be described. For a noise field with a predominately low frequency range, the long-term IACF has no sharp peaks for the delay range of $-1<\tau<+1$ ms, and $W_{IACC}$ becomes wider. $W_{IACC}$ is obtained by following equation.

$$W_{IACC}^{(\delta)} = \frac{4}{\Delta\omega_c}\cos^{-1}\left(1 - \frac{\delta}{IACC}\right)[s] \quad (25)$$

where $\Delta\Omega_c=2\pi(f_1+f_2)$, and $f_1$ and $f_2$ are lower and upper frequency of an ideal filter, respectively. For sake of simplicity, $\delta$ is defined by 0.1 (IACC).

Figure 10A:
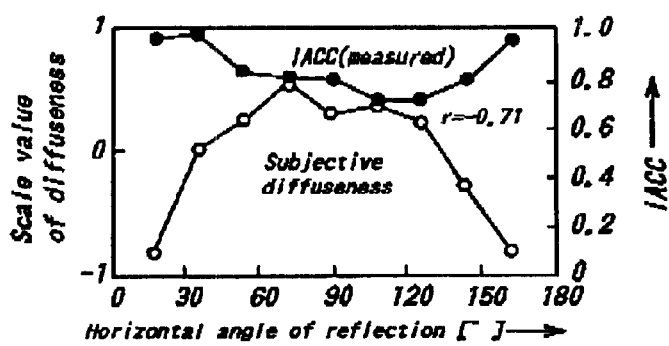
FIG. 10 is a graph plotting scale value of diffuseness on a left vertical axis, value of IACC on a right vertical axis and horizontal angle of reflection on a horizontal axis.
Figure 10B:
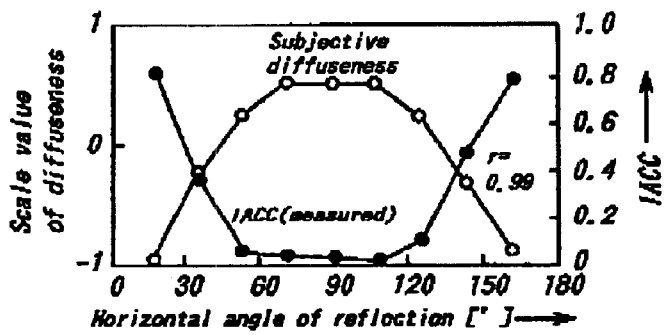
Figure 10C:
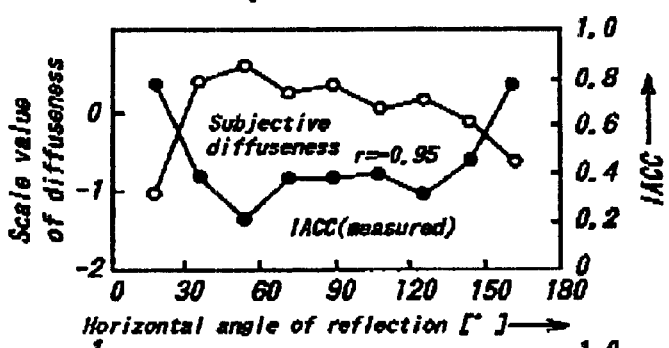
Figure 10D:
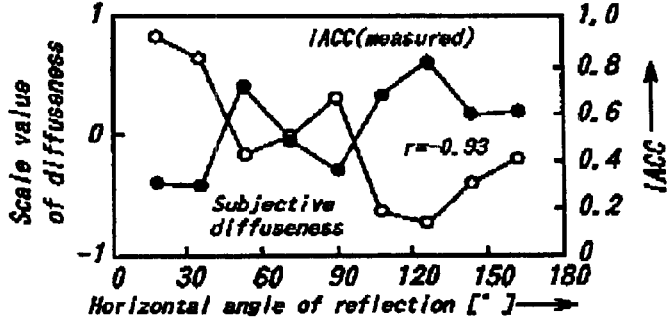
Figure 10E:
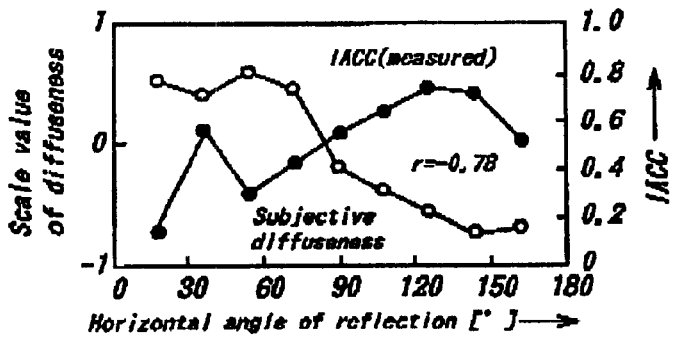
Figure 11A:
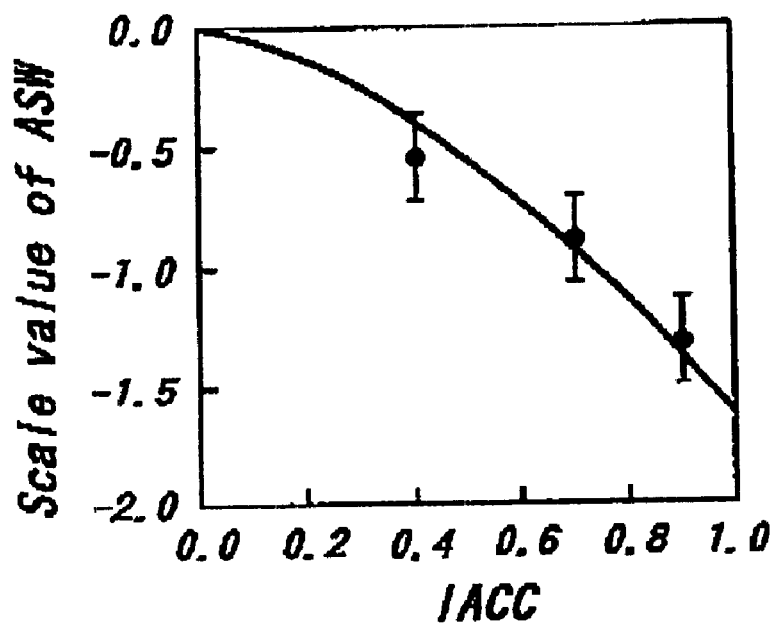
FIG. 11(a) is a graph plotting values of ASW on a vertical axis and values of IACC on a horizontal axis.

Of particular interest is that a wider ASW nay be perceived with low frequency bands and by decreasing the IACC. More clearly, the ASW may be obtained by both factors, IACC and $W_{IACC}$, under the conditions of a constant LL and $\tau_{IACC}=0$. The scale values of ASW were obtained by paired-comparison test with ten subjects as listeners. In order to control the values of $W_{IACC}$, the center frequencies were varied within a range of 250 kHz to 2 kHz. The values of IACC were adjusted by controlling the sound pressure ratio of the reflections to the level of the direct sound. The listening level affects ASW, therefore, the total sound pressure levels at the ear entrances of all noise fields were kept constant at a peak of 75 dBA. The listeners judged which of two noise sources they perceived to be wider. The results of the analysis of variance for the scale values $S_{ASW}$ indicate that both of factors IACC and $W_{IACC}$ are significant (p<0.0), and contribute to $S_{ASW}$ independently. Thus, $S_{ASW}$ can be represented by following equation.

$$S_{ASW}=a(IACC)^{3/2}+b(W_{IACC})^{1/2} \quad (26)$$

where coefficients a=−1.64, b=2.44 are obtained by regressions of the scale values with ten subjects as shown in FIGS. 11(a) and 10(b), respectively.

Figure 11B:
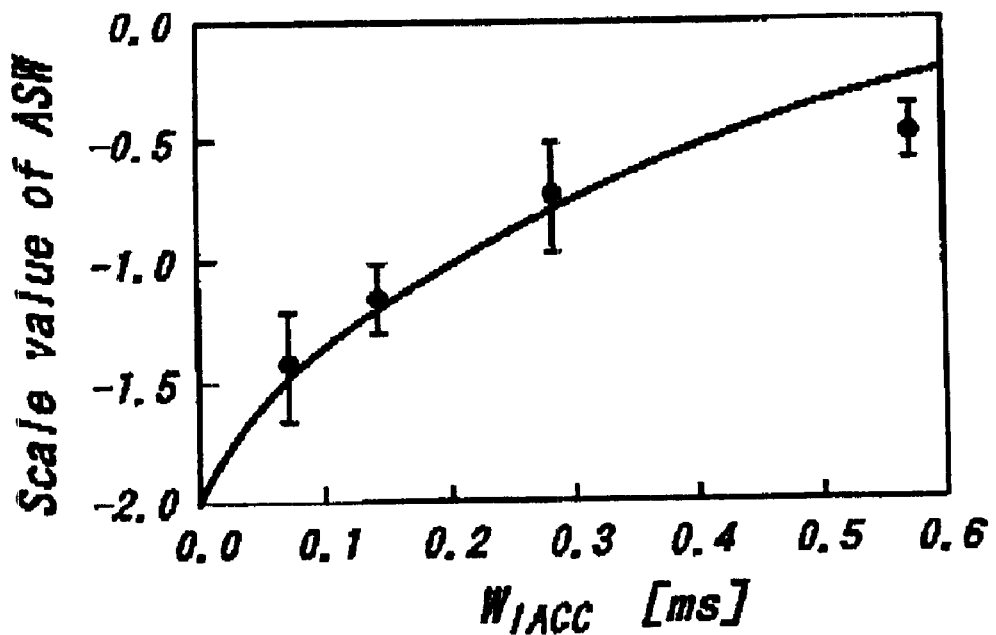
FIG. 11(b) is a graph plotting values of ASW on a vertical axis and values of $W_{IACC}$ on a horizontal axis.
Figure 12:
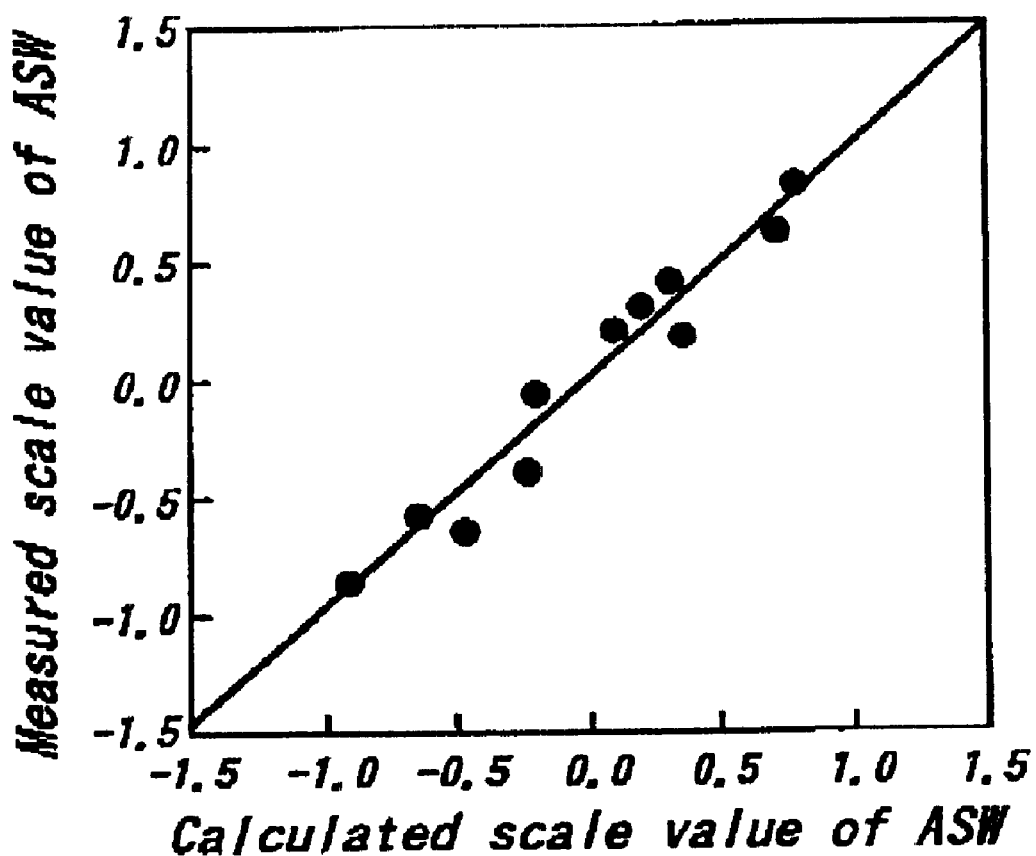
FIG. 12 is a graph plotting scale values of ASW (actual measurements) on a vertical axis and calculated scale values of ASW on a horizontal axis.
Figure 13A:
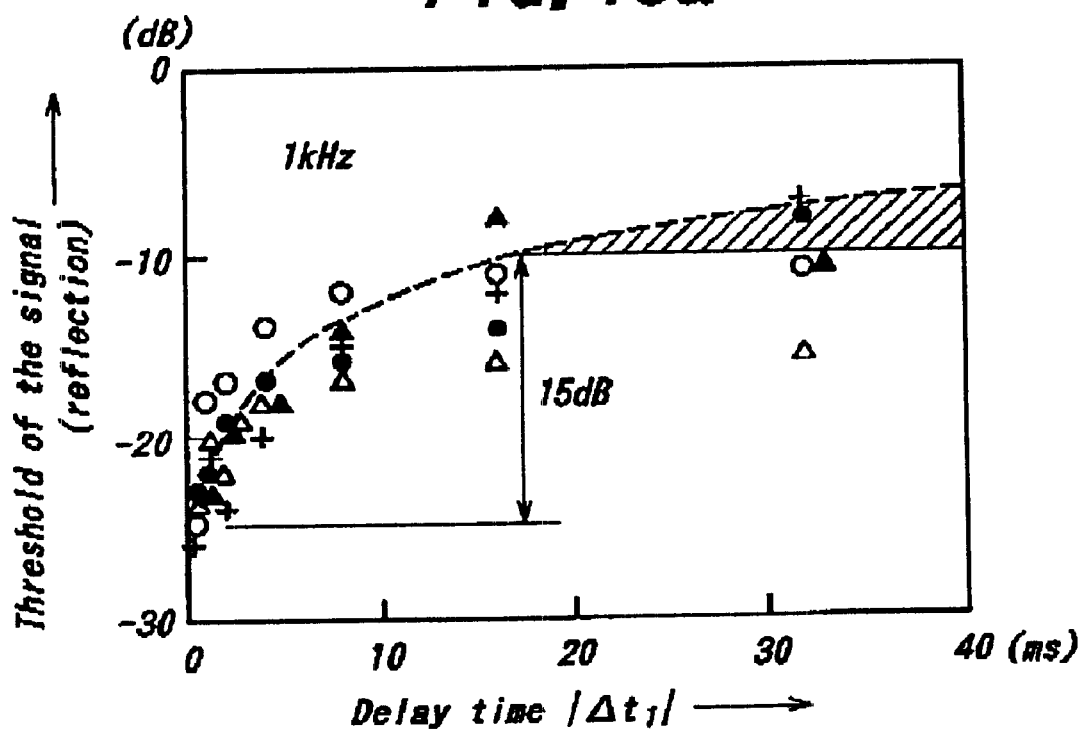
FIG. 13 is a graph plotting values of threshold of the signal on a vertical axis and values of the delay time on a horizontal axis.
Figure 13B:
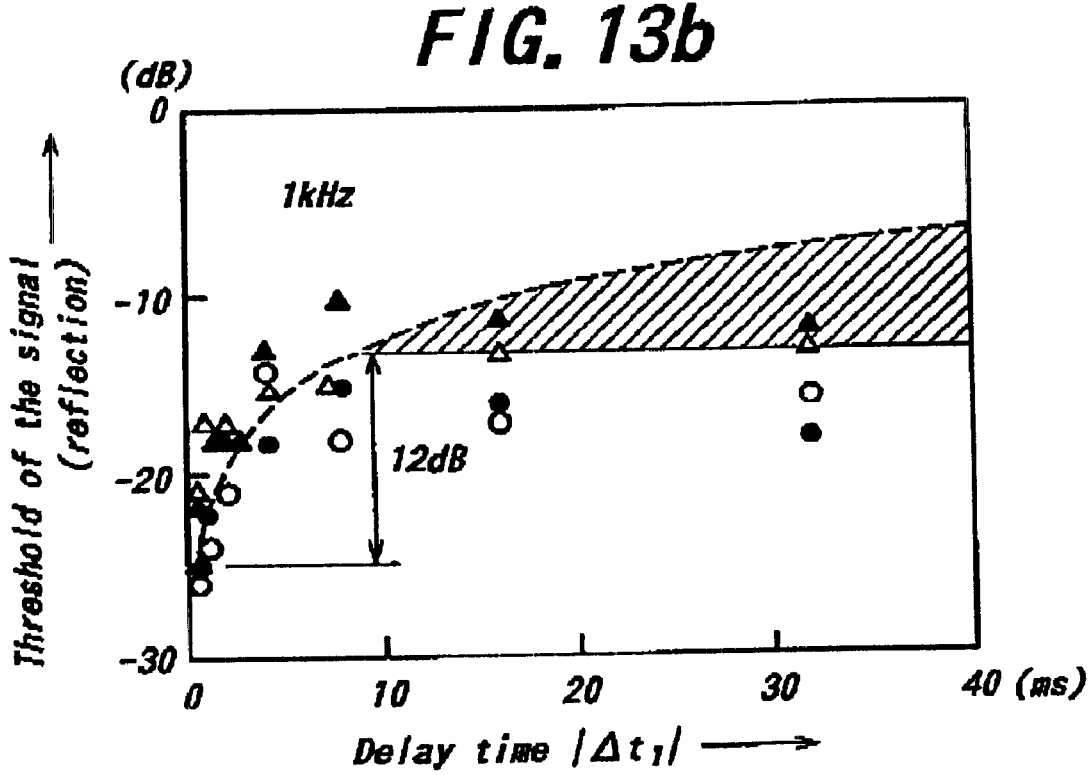

FIG. 11(a) is a graph plotting values of ASW on a vertical axis and values of IACC on a horizontal axis, and FIG. 11(b) is a graph plotting values of ASW on a vertical axis and values of $W_{IACC}$ on a horizontal axis. FIG. 12 is a graph plotting scale values of ASW (actual measurements) on a vertical axis and calculated scale values of ASW on a horizontal axis. It is found that the calculated scale values $S_{ASW}$ by equation (26) and measured scale values are in good agreement (r=0.97, p<0.1).

To assess fluctuating-environmental noise on time axis, we use the running short-time ACF as well as the running short-time IACF. Running short-time spatial and temporal factors extracted as a similar manner to above are used to describe the primitive sensations of a fluctuating-noise field. The short-time ACF is defined by $$\Phi_P(\tau) = \frac{1}{2T}\int_{-T}^{+T} p'(t)p'(t+\tau)dt \quad (27)$$

where 2T is determined by the signal duration to be analyzed. This 2T should be selected covering at least the minimum value of effective duration, $(\tau_e)_{min}$ contains the most rapid movement in the signal, thus this particular influence s most greatly the subjective responses.

For the loudness $S_L$ of each noise piece, equation (15) can be replaced by $$S_L=f_L(LL, \tau_1, \phi_1, \tau_e) \quad (28)$$

Here each factor is obtained for each noise piece, and the $\Phi(0)$ in equation (15) has been replaced by LL. It is worth noticing that the temporal factors extracted from the ACF must be influenced by repetitive reflections ($\Delta t_1, \Delta t_2, \ldots$) and the subsequent reverberation time ($T_{sub}$) in a room.

In describing the pitch of the environmental noise field, the significant temporal factors of the noise field are $\tau_1$ and $\phi_1$, thus equation (17) holds.

The timbre of the environmental noise field may be expressed by all of the temporal and spatial factors, so that $$S_L=f_T(\tau_e, \tau_1, \phi_1, \tau'_1, \phi'_n, LL, IACC, \tau_{IACC}, W_{IACC}) \quad (29)$$

Considering the fact that human cerebral hemisphere are specialized in such way that temporal factors are associated with the left hemisphere and spatial factors are associated with the right hemisphere, we can rewrite equation (29) as $$S_L=f_T(\tau_e, \tau_1, \phi_1)_{left}+f_T(LL, IACC, \tau_{IACC}, W_{IACC})_{right}$$

Threshold of the weak reflection is shown in FIG. 3 as a function of $\Delta t_1$. The spatial direction of reflection to the listener (IACC and $\tau_{IACC}$) and the delay time of reflection $\Delta t_1$, as included equation (29), express this threshold.

The ear sensitivity may be characterized by the physical system including the external ear and the middle ear. Before analyzing the sound signal, we can use an A-weighting network for the sake of convenience.

The intelligibility of single syllables as a function of the delay time of single reflection can be calculated by the four orthogonal factors extracted from the short-term ACF analyzed for the piece between consonant and vowel sounds. A recent investigation clearly shows that timbre or dissimilarity judgment is a overall subjective response similar for the subjective preference of sound fields in a concert hall. The subjective preference as well as timbre can be described by the use of the minimum value of $\tau_e$. A short-term-integration time is given by $$(2T)=30(\tau_e)_{min} \quad (30)$$

Effects of noise on mental tasks can be interpreted as an interference phenomenon between the task performance and the hemispheric dominance. Temporal factors extracted from the ACF are associated with the left cerebral hemisphere and spatial factors extracted from IACF are much concerned with the right.

Figure 14:
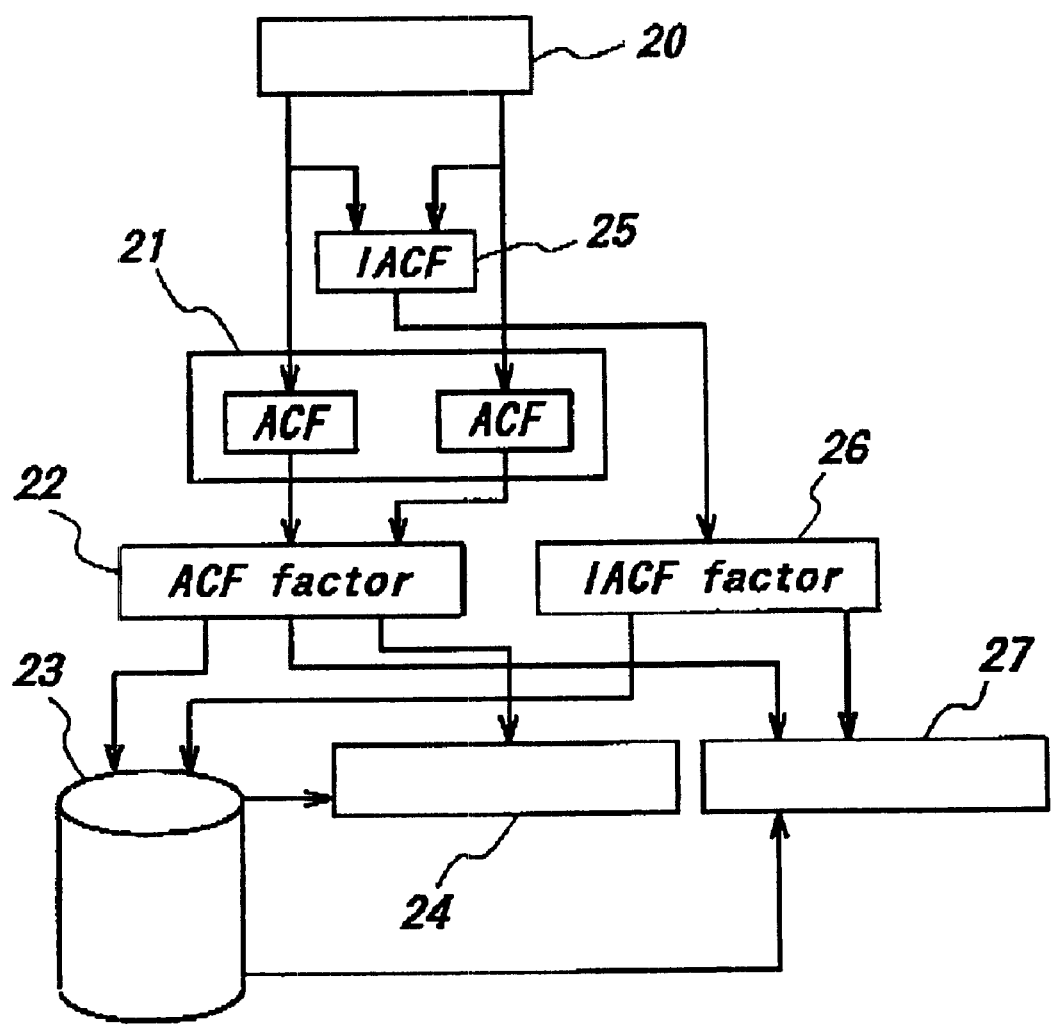
FIG. 14 is a block diagram depicting a basic configuration of the system for evaluating the sound according to the invention.

FIG. 14 is a block diagram depicting a basic configuration of the sound evaluating system according to the invention. The system for evaluating the sound is basically same as the system shown in FIG. 1. However, some of the components of the computer in this sound evaluation system (FIG. 14) are different from those of the system shown in FIG. 1. As shown in FIG. 14, the present sound evaluation system includes binaural sound recording means 20 (left and right dual channels), ACF calculating means 21 for calculating an autocorrelation function from the recorded sound signals, ACF factor calculating means 22 for calculating autocorrelation function factors from the calculated autocorrelation function, IACF calculating means 25 for calculating interaural crosscorrelation function from the recorded sound signals, IACF factor calculating means 26 for calculating interaural crosscorrelation function factors from the calculated IACF, sound evaluation means 24 for evaluating the sound based on the calculated ACF factors, sound evaluation means 27 for evaluating the sound based on the calculated ACF factors and/or IACF factors, and data base 23 storing a wide variety of data.

Figure 15:
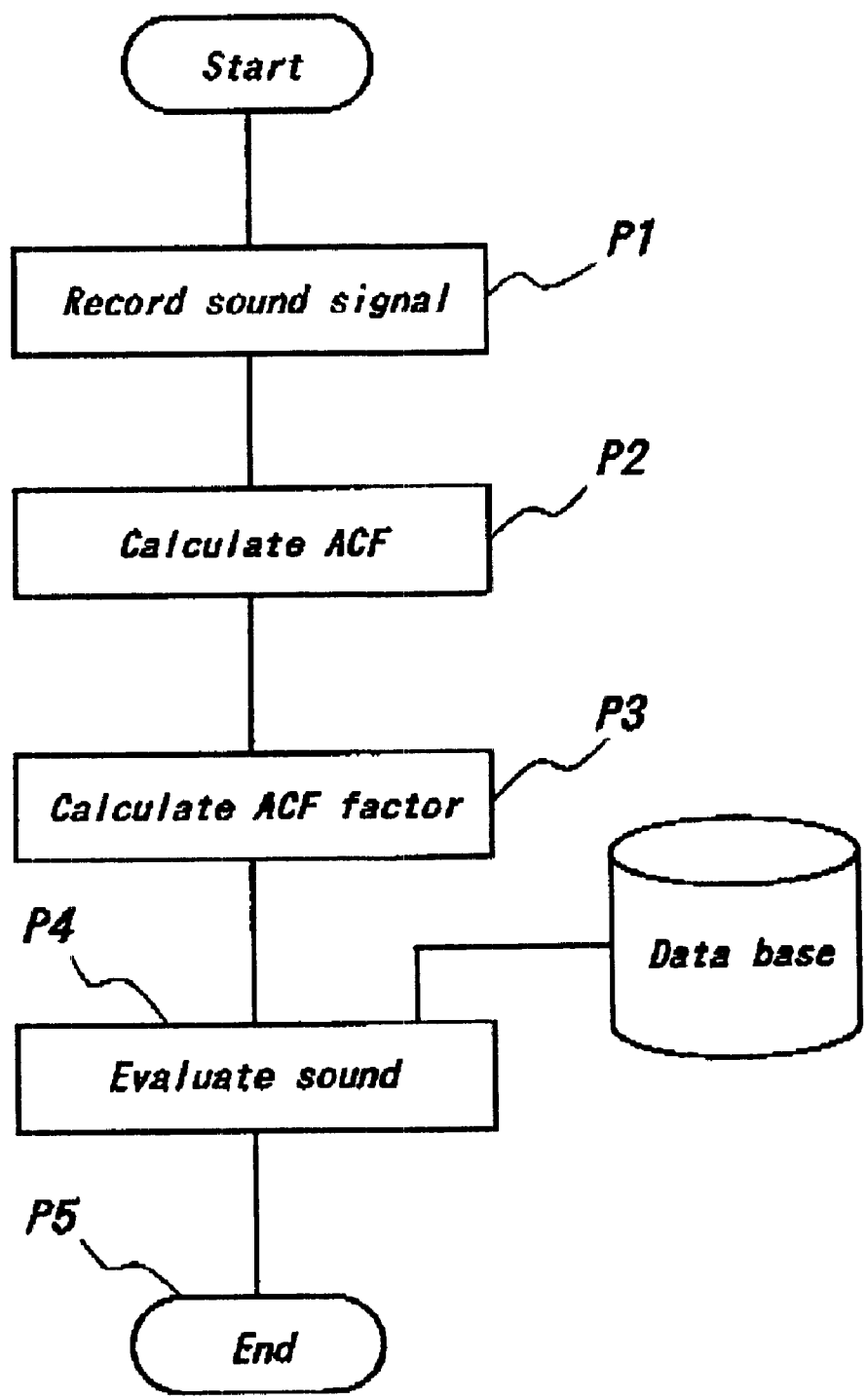
FIG. 15 is a flowchart illustrating the basic steps in a method for evaluating the sound including.

FIG. 15 is a flowchart illustrating the basic steps of the sound evaluating method according to the invention. A shown in FIG. 15, in a step P1, a sound from a sound source is captured by microphones (not shown) into sound signals. It should be noted that line-in digital or analogue signals may be used instead of the acoustic signals captured by the microphones. The recorded sound signals are supplied to an A/D converter (not shown) via LPF 3 (not shown) and are converted into digital values. In a step P2, a computer i.e. CPU calculates ACF and IACF by passing the digital sounds signals. In a step P3, the CPU calculates ACF factors and IACF factors from the calculated ACF and IACF. There is previously established a database storing the following data: tone data associating tones with ACF factors, prosodic data associating prosodic elements with ACF factors, evaluation data associating subjective evaluation values with ACF factors. Next, association between respective data in the database and ACF or IACF factors will be described. For instance, a certain instrument is played, sounds generated by the instrument are captured by the present system and are converted into sound signals, and ACF factors and IACF factors are calculated. For respective sounds, various kinds of data (such as tone color, timbre and subjective evaluation) are obtained by calculating ACF factors and IACF factors or by another known calculation method. Then, the ACF factors and IACF factors and corresponding data for respective sounds are stored in the database in a mutually associated manner. In a step P4, CPU evaluates the sounds based on the calculated ACF factors and IACF factors. Upon performing this evaluation, the target data is read out from the database to effect the comparison and consideration.

FIG. 16 is a graph showing a normalized ACF of acoustic signals captured from a piano, an amplitude being plotted on a vertical axis and values of the delay time being plotted on a horizontal axis. FIGS. 16(a), 16(b) and 16(c) show wave shapes of the normalized ACF extract from captured piano sound signals which sounded in frequencies at A1 (55 Hz), A2 (220 Hz) and A6 (1760 Hz), respectively. In this figures, it can be defined that maximum peak value is $\phi_1$, its delay time is $\tau_1$, peak values within the delay time is $\phi'_n$, its delay time $\tau'_n$. Here, $\tau_1$ and $\phi_1$, which are physical factors, correspond to pitch and strength of the pitch, respectively. As shown in FIG. 16, an inverse number of the $\tau_1$ corresponds to the pitch frequency. For example, in FIG. 16(a), the piano sound source sounds at a frequency of 55 Hz, ACF factors are calculated from the piano sound signals. $\tau_1$, one of the ACF factors is approximately 18 ms, an inverse number of $\tau_1$ is 55. Thus it is found that the inverse number of $\tau_1$ correlates (i.e. corresponds) to the pitch frequency of the piano sound source. This correlation will be explained much more clearly with reference to FIG. 17.

Figure 17:
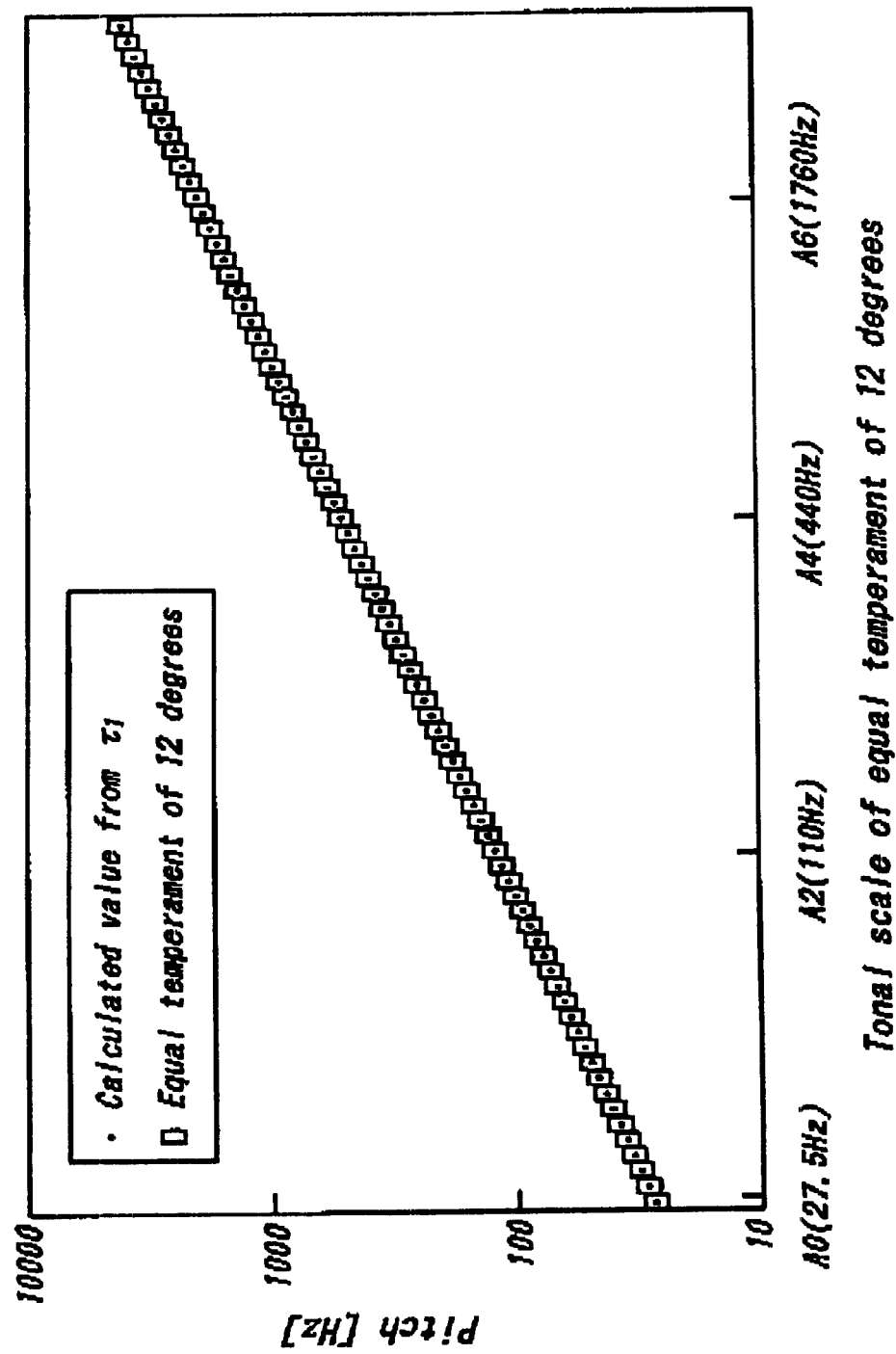
FIG. 17 is a graph representing a pitch (Hertz) on a vertical axis and a tone scale of twelve-degree temperament on a horizontal axis.

FIG. 17 is a graph plotting values of pitch on a vertical axis and values of the tonal scale in equal temperament of 12 degrees on a horizontal axis. Squares in the figure are values of pitch of the scale in equal temperament of 12 degrees, which are calculated using predetermined formula. Black circles in figures are values of pitch calculated based on the above mentioned $\tau_1$. As shown in FIG. 17, values of pitch in equal temperament of 12 degrees are coincide with values of pitch extracted from $\tau_1$. The pitch calculated from $\tau_1$ at A6 is run off, it seems to be miss tune. In such a way, ACF factor, $\tau_1$, can be utilized to tune various instruments other than a piano but also. In addition, in this system, the database stores therein correlation between various ACF factors (energy *represented at the origin of the delay (i.e. delay time is zero); an effective duration $\tau_e$; a delay time of a first peak $\tau_1$; and an amplitude of a first peak of a normalized ACF $\phi_1$, information of respective peaks within the delay time (from zero to $\tau_1$) extracted from ACFs, $\tau_n'$, $\phi_n'$ (n=1, 2, 3, . . . , N (N is an integer less than approximately 10)), and IACF factors extracted from IACF and the subjective evaluation of the real instruments. The present system can be used to compare data stored in the database and the factors extracted from the sound signals generated by instrument sound source. Thus the present system can be utilized as a support system to research excellent sounds (having good timbre or good subjective evaluation).

Prior to the tuning with the aid of the present system, tonal scale data, which includes various prosodic (such as just or equal temperament) is stored in the database. It is preferable that user can select a desired prosodic according to the his or her own object. Also, it is preferable to set equal temperament as a default. Reference tone A4 is set at 440 Hz as a default, and the value may be changed by 1 Hz step. In addition, reference tone may be generated in pure tone. In such a way, it is preferable that the reference frequency and kinds of tonal scale can be changed. If equal tone is selected, the nearest musical scale (such as A or C#) is presented. Alternatively, when desired data (i.e. tonal scale) is selected from the database, a numeric value indicating a difference between desired data and a sound generated by an instrument may be presented. For example, if a desired tonal scale is A2 (i.e. aimed tuning to A2), the database is referenced, then pitch frequency associated with A2 is read out of the database, the readout data is compared with the pitch frequency obtained by the $\tau_1$ extracted from the sounds to indicate the numeric value presenting a difference between them. In this connection, the difference may be presented as not only a difference in numeric value but also a difference in tonal scale. In addition, a value of a difference between a value of tonal scale of the sounds and a desired tonal scale or the nearest tonal scale can be presented by this system, and an indicator showing which of tones (value of the generated sound and value of the database) is higher or lower or they are just same, can be equipped with in this system.

Thus, the sound evaluating system according to the present invention can be utilized to support the manufacturing of instruments generating excellent sounds in such a way that ACF factors and/or IACF factors calculated from the sound generated by the instrument are compared with corresponding data previously stored in the database. In particular, according to the present invention, it makes it possible to know spatial impression of the sound field. Also, the system according to the present invention may be utilized not only for craftsman but also for researchers, singers, players, and instruments can be tuned toward theirs desired performances. The tuning and sound evaluation according to the invention can be utilized for various instruments such as acoustic musical instruments (such as keyboards, strings and wind instruments) and electronic musical instruments.

In consideration of the various embodiments of the systems or methods according to the invention, the principle of the invention can widely be applied Further, it should be understood that the detailed description and specific examples, while indicating preferred embodiments of the invention, are given by way of illustration only, not to be used to interpret the scope of the invention. Various changes and modifications within the spirit and scope of the invention will become apparent to those skilled in the art from this detailed description. In this specification, although the pitch, which is one of the evaluation value, is described in detail, it should be understood that other various evaluation such as timbre or tone color may be evaluated according to the present invention.

What is claimed is:

1. A method for evaluating a sound, comprising the steps of:
   capturing the sound and converting the captured sound into an acoustic signal;
   calculating an autocorrelation function ACF from the acoustic signal with the aid of computing means;
   calculating autocorrelation function factors from the calculated autocorrelation function ACF with aid of the computing means; and
   evaluating the sound based on the ACF factors and a preestablished database with the aid of the computing means, said database storing at least one of the following data; tone data associating tones with ACF factors, prosodic data associating prosodic elements with ACF factors and subjective evaluation data associating subjective evaluation values with ACF factors.

2. The method according to claim 1, wherein said ACF factor calculating step comprises
   calculating at least one of following ACF factors: energy $\Phi(0)$ represented at the origin of delay represented by a delay time of zero; effective duration $\tau_e$; delay time of a maximum peak $\tau_1$; an amplitude of a maximum peak of a normalized ACF $\phi_1$; and information of respective peaks within the delay time (from zero to $\tau_1$)$\tau_n'$, $\phi_n'$ (n=1, 2, 3, ..., N (N is an integer less than approximately 10)).

3. The method according to claim 2, wherein the method further comprises the steps of:
   calculating a pitch frequency from the delay time of the maximum peak $\tau_1$ of the ACF; and
   performing a timing by comparing the calculated pitch frequency with data of a predetermined tonal scale stored in the database to derive a difference therebetween.

4. The method according to claim 1, wherein the method further comprises the steps of:
   capturing the sound in a binaural manner and converting the captured sound into acoustic binaural signals;
   calculating an interaural crosscorrelation function IACF between the acoustic signals at left and right ears from the acoustic binaural signals with the aid of the computing means;
   calculating interaural crosscorrelation function factors from the calculated interaural crosscorrelation function IACF with the aid of the computing means; and
   evaluating the sound or evaluating subjectively the sound based on the IACF factors and/or the ACF factors and the said preestablished database with the aid the computing means.

5. The method according to claim 2, wherein the method further comprises the steps of:
   capturing the sound in a binaural manner and converting the captured sound into acoustic binaural signals;
   calculating an interaural crosscorrelation function IACF between the acoustic signals at left and right ears from the acoustic binaural signals with the aid of the computing means;
   calculating interaural crosscorrelation function factors from the calculated interaural crosscorrelation function IACF with the aid of the computing means; and
   evaluating the sound or evaluating subjectively the sound based on the IACF factors and/or the ACF factors and the said preestablished database with the aid the computing means.

6. A system for evaluating a sound comprising:
   sound capturing means for capturing the sound and converting the captured sound into an acoustic signal;
   ACF calculating means for calculating an autocorrelation function ACF from the acoustic sign;
   ACF factor calculating means for calculating autocorrelation function factors from the calculated autocorrelation function ACF; and
   evaluating means for evaluating the sound based on the ACF factors and a preestablished database, said database storing at least one of the following data; tone data associating tones with ACF factors, prosodic data associating prosodic elements with ACF factors and subjective evaluation data associating subjective evaluation values with ACF facts.

7. The system according to claim 6, wherein said ACE factor calculating means comprises
   calculating means for calculating at least one of the following ACF factors: energy $\Phi(0)$ represented at the origin of delay defined by a delay time of zero; an effective duration $\tau_e$; a delay time of a maximum peak $\tau_1$; an amplitude of maximum peak of the normalized ACF $\phi_1$; and information of respective peaks within the delay time (from zero to $\tau_1$)$\tau_n'$, $\phi_n'$ (n-1, 2, 3, ..., N (N is an integer less than approximately 10)).

8. The system according to claim 7, wherein the system further comprises:
   calculating means for calculating a pitch frequency from the delay time $\tau_1$ of the ACF; and
   tuning means for comparing the calculated pitch frequency with data of a predetermined tonal scale database to represent a difference between them.

9. The system according to claim 6, further comprising:
   capturing means for capturing the sound in a binaural manner and converting the captured sound into acoustic binaural signals;
   IACF calculating means for calculating an interaural crosscorrelation function IACF between the acoustic signals at left and right ears from the acoustic binaural signals;
   IACF factor calculating means for calculating interaural crosscorrelation function factors from the calculated interaural crosscorrelation function IACF and
   evaluating means for evaluating the sound or evaluating subjectively the sound based on the IACF factors and/or the ACF factors and the said predetermined database.

10. The system according to claim 7, wherein the system further comprises:
    capturing means for capturing the sound in a binaural manner and converting the captured sound into acoustic binaural signals;
    IACF calculating means for calculating an interaural crosscorrelation function IACF between the acoustic signals at left and right ears from the acoustic binaural signal;
    IACF factor calculating mans for calculating interaural crosscorrelation function factors from the calculated interaural crosscorrelation function IACF; and
    evaluating means for evaluating the sound or evaluating subjectively the sound based on the IACF factors and/or the ACF factors and the said predetermined database.

* * * * *